United States Patent [19]

Cimini, Jr. et al.

[11] Patent Number: 5,008,958

[45] Date of Patent: Apr. 16, 1991

[54] POLARIZATION-INSENSITIVE TECHNIQUE FOR COHERENT OPTICAL COMMUNICATION

[75] Inventors: Leonard J. Cimini, Jr., Howell; Isam M. I. Habbab, Old Bridge, both of N.J.

[73] Assignee: AT&T Bell Laboratories, Murray Hill, N.J.

[21] Appl. No.: 308,697

[22] Filed: Feb. 8, 1989

Related U.S. Application Data

[63] Continuation-in-part of Ser. No. 145,446, Jan. 19, 1988, abandoned, and a continuation-in-part of Ser. No. 145,358, Jan. 19, 1988, abandoned.

[51] Int. Cl.$^5$ ............................................. H04B 10/06
[52] U.S. Cl. .................................. 455/619; 455/608; 455/616
[58] Field of Search ............... 455/619, 616, 600, 606, 455/607, 608; 307/1, 3, 2

[56] References Cited

PUBLICATIONS

I. P. Kaminow, "Polarization in Optical Fibers", IEEE J. Quant. Electron., vol. QE-17, No. 1, Jan. 1981, pp. 15-22.
T. Okoshi, "Recent Advances in Coherent Optical Fiber Communication Systems", J. Lightwave Tech., vol. LT-5, No. 1, Jan. 1987, pp. 44-52.
I. P. Kaminow, "Polarization Maintaining Fibers", Applied Scientific Research, vol. 41, 1984, pp. 257-270.
J. Noda et al., "Polarization-Maintaining Fibers and Their Applications", J. Lightwave Tech., vol. LT-4, No. 8, Aug. 1986, pp. 1071-1089.
M. Monierie, "Polarization-Maintaining Single-Mode Fiber Cables: Influence of Joins", App. Optics., vol. 20, No. 14, Jul. 1981, pp. 2400-2406.
R. Ulrich, "Polarization Stabilization on Single-Mode Fiber", App. Phys. Lett., vol. 35, No. 11, Dec. 1979, pp. 840-842.
M. Kubota et al., "Electro-Optical Polarisation Control on Single-Mode Optical Fibers", Electron. Lett., vol. 16, No. 15, Jul. 17, 1980, p. 573.
Y. Kodoh et al., "Polarization Control on Output of Single-Mode Optical Fibers", IEEE J. Quant. Electron., vol. QE-17, No. 6, pp. 991-994.
H. C. Lefevre, "Single-Mode Fibre Fractional Wave Devices and Polarisation Controllers", Electron. Lett., vol. 16, No. 20, Sep. 25, 1980, pp. 778-780.
T. Imai et al., "Optical Polarisation Control Utilising an Optical Heterodyne Detection Scheme", Electron. Lett., vol. 21, Jan. 17, 1985, pp. 52-53.

(List continued on next page.)

Primary Examiner—Reinhard J. Eisenzopf
Assistant Examiner—L. Van Beek
Attorney, Agent, or Firm—Samuel H. Dworetsky

[57] ABSTRACT

To exploit the potential advantages of coherent optical communications systems, the polarization states of the received optical signal and the local oscillator waves must be matched. A mismatch may severely degrade detection performance. These mismatches occur because the received signal state of polarization changes with time and along the fiber. We first review several existing techniques for handling this problem, such as polarization-maintaining fibers, polarization-state controllers and polarization-diversity receivers. The insensitive technique reduces the problem of polarization mismatch by forcing the polarization state of either the transmitted signal or local oscillator to vary with time in a non-adaptive manner so that polarization-insensitive performance is obtained. The proposed scheme adopts a completely new approach which uses high-birefringence single-mode fibers to implement polarization switching. These techniques require only a single photodetector and give a fixed level of detection performance, with a power penalty relative to ideal of 3 dB. A specific technique is presented in which polarization-insensitive heterodyne detection is achieved through data-induced polarization switching. The polarization switching is brought about by inserting a passive, birefringent optical device in the path of the transmitted FSK signal.

6 Claims, 24 Drawing Sheets

OTHER PUBLICATIONS

T. Okoshi et al., "New Polarisation-Control Scheme for Optical Heterodyne Receiver Using Two Faraday Rotators", Electron. Lett., vol. 21, No. 18, Aug. 29, 1985, pp. 787–788.

T. Okoshi et al., "A New Polarisation-State Control Device: Rotatable Fiber Cranks", Electron. Lett., vol. 21, No. 20, Sep. 26, 1985, pp. 895–896.

T. Okoshi, "Polarisation-State Control Schemes for Heterodyne or Homodyne Optical Fiber Communications", J. Lightwave Tech., vol. LT-3, No. 6, Dec. 1985, pp. 1232–1237.

T. Okoshi, "Heterodyne-Type Optical Fiber Communications", IOOC '81, San Francisco, Apr. 1981, p. 44.

T. Okoshi, "Polarization-Diversity Receiver for Heterodyne/Coherent Optical Fiber Communications", IOOC '83, Jun. 1983, pp. 386–387.

T. G. Hodgkinson et al., "Demodulation of Optical DPSK Using In-Phase and Quadrature Detection", Electron Lett., vol. 21, No. 19, Sep. 12, 1985, pp. 867–868.

B. Glance, "Polarization Independent Coherent Optical Receiver", J. Lightwave Tech., vol. LT-5, No. 2, Feb. 1987, pp. 274–276.

H. L. Van Trees, Detection, Estimation and Modulation Theory, Part I, John Wiley, 1968, pp. 335–348.

D. Kreit et al., "Polarization-Insensitive Optical Heterodyne Receiver for Coherent FSK Communications", Electron. Lett., vol. 23, No. 4, Feb. 12, 1987, pp. 168–169.

A. J. Noda et al., "Single-Mode Fiber Devices", Optoelectronics-Devices and Technologies, vol. 1, No. 2, Dec. 1986, pp. 175–194.

T. G. Hodgkinson et al., "Polarisation Insensitive Heterodyne Detection Using Polarisation Scrambling", Electron. Lett., vol. 23, No. 10, May 7, 1987, pp. 513–514.

L. J. Cimini, Jr., "Analysis and Simulation of a Digital Mobile Channel Using Orthogonal Frequency Division Multiplexing", IEEE Trans. Commun., vol. COM-33, No. 7, Jul. 1985, pp. 665–675.

R. C. Alferness et al., "Electro-Optic Waveguide TE-TM Mode Converter with Low Drive Voltage", Optics Lett., vol. 5, No. 11, Nov. 1980, pp. 473–475.

R. C. Alferness, "Electrooptic Guided-Wave Device for General Polarization Transformations", IEEE J. Quant. Electron., vol. QE-17, No. 6, Jun. 1981, pp. 965–969.

R. C. Alferness et al., "High-Speed Waveguide Electro-Optic Polarization Modulator", Optics Lett., vol. 7, No. 10, Oct. 1982, pp. 500–502.

R. C. Alferness et al., "Low Loss, Wavelength Tunable, Waveguide Electro-Optic Polarization Control for $\lambda = 1.32\ \mu m$", App. Physics Lett., vol. 47, No. 11, Dec. 1985, pp. 1137–1139.

D. G. Carlson et al., "Intracavity Electrooptic Frequency Tuning Polarization Switching and Q-Switching of a Nd:YAG Laser Oscillator", IEEE J. Quant. Electron., vol. QE-4, No. 3, Mar. 1968, pp. 93–98.

S. T. Hendow et al., "Observation of Bistable Behavior in the Polarization of a Laser", Optics Lett., vol. 7, No. 8, Aug. 1982, pp. 356–358.

Y. C. Chen et al., "Polarization Bistability in Semiconductor Lasers", App. Phy. Lett., vol. 46, No. 1, Jan. 1985, pp. 356–358.

S. E. Harris et al., "Optical Network Synthesis Using Birefringent Crystals", IEEE Proc., vol. 52, No. 4, Apr. 1964, pp. 411–412.

S. E. Harris, "Demodulation of Phase-Modulated Light Using Birefringent Crystals", IEEE Proc., vol. 52, No. 7, Jul. 1964, pp. 823–831.

R. Ulrich et al., "Polarization Optics of Twisted Single-Mode Fibers", App. Optics, vol. 18, No. 13, Jul. 1979, pp. 2241–2251.

M. Ross, Laser Receivers, Wiley, 1966, pp. 244–250.

FIG. 4
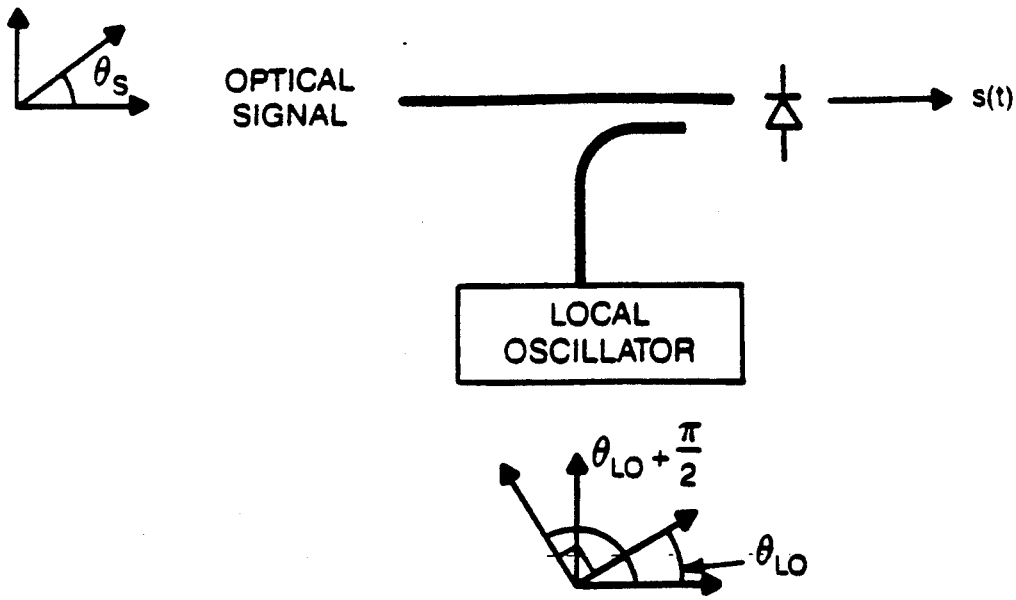
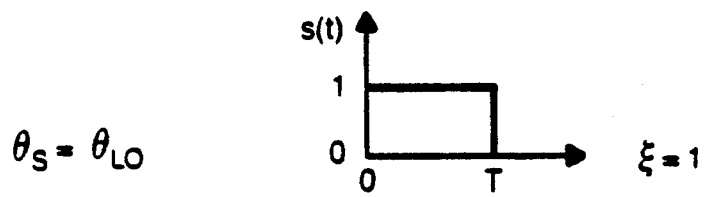
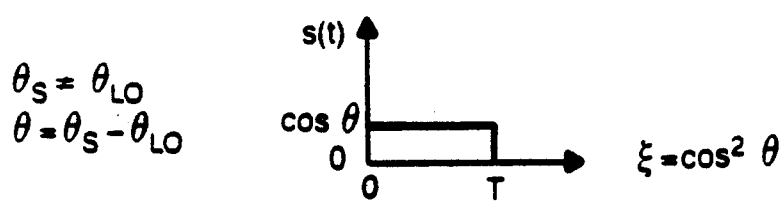
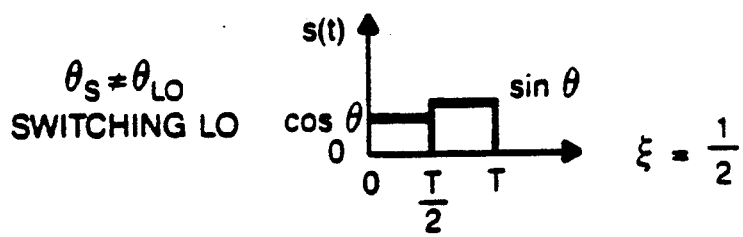

FIG. 7
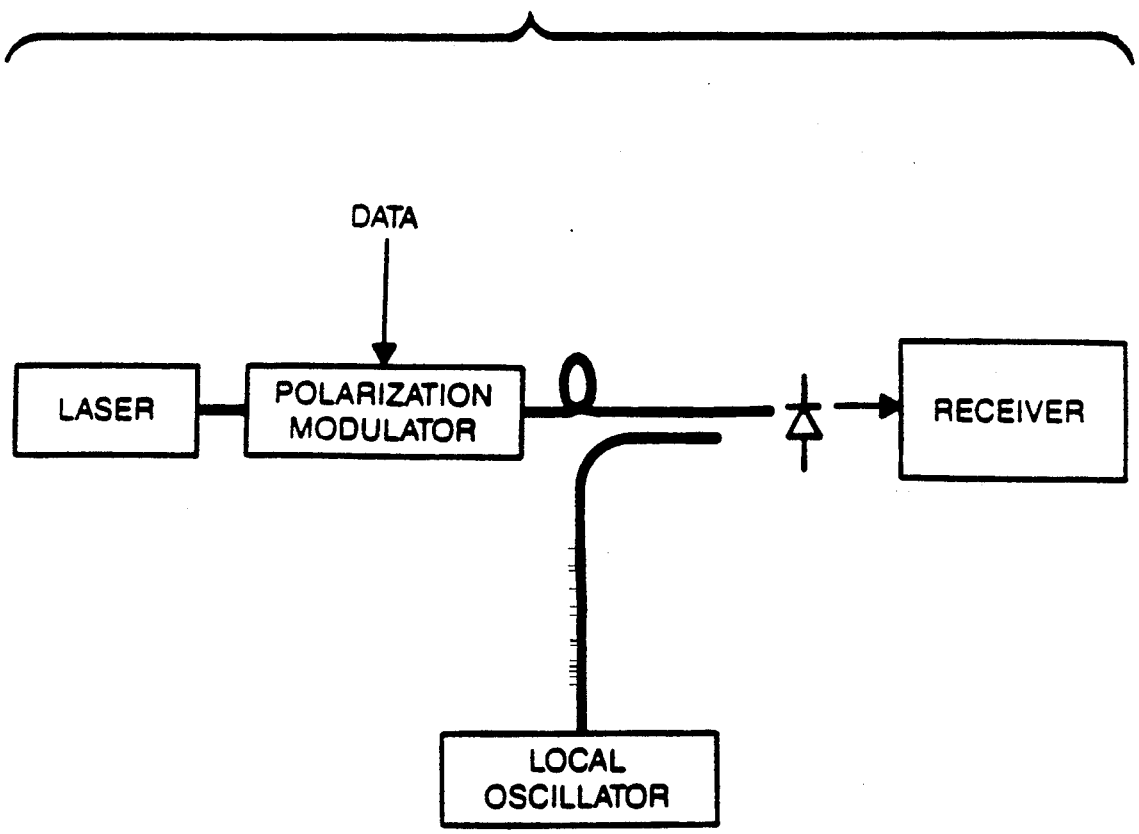
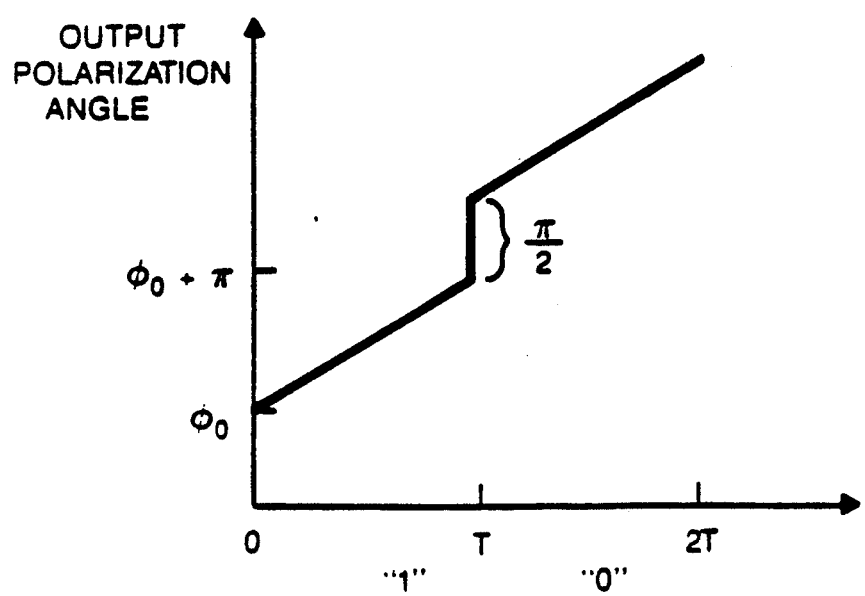

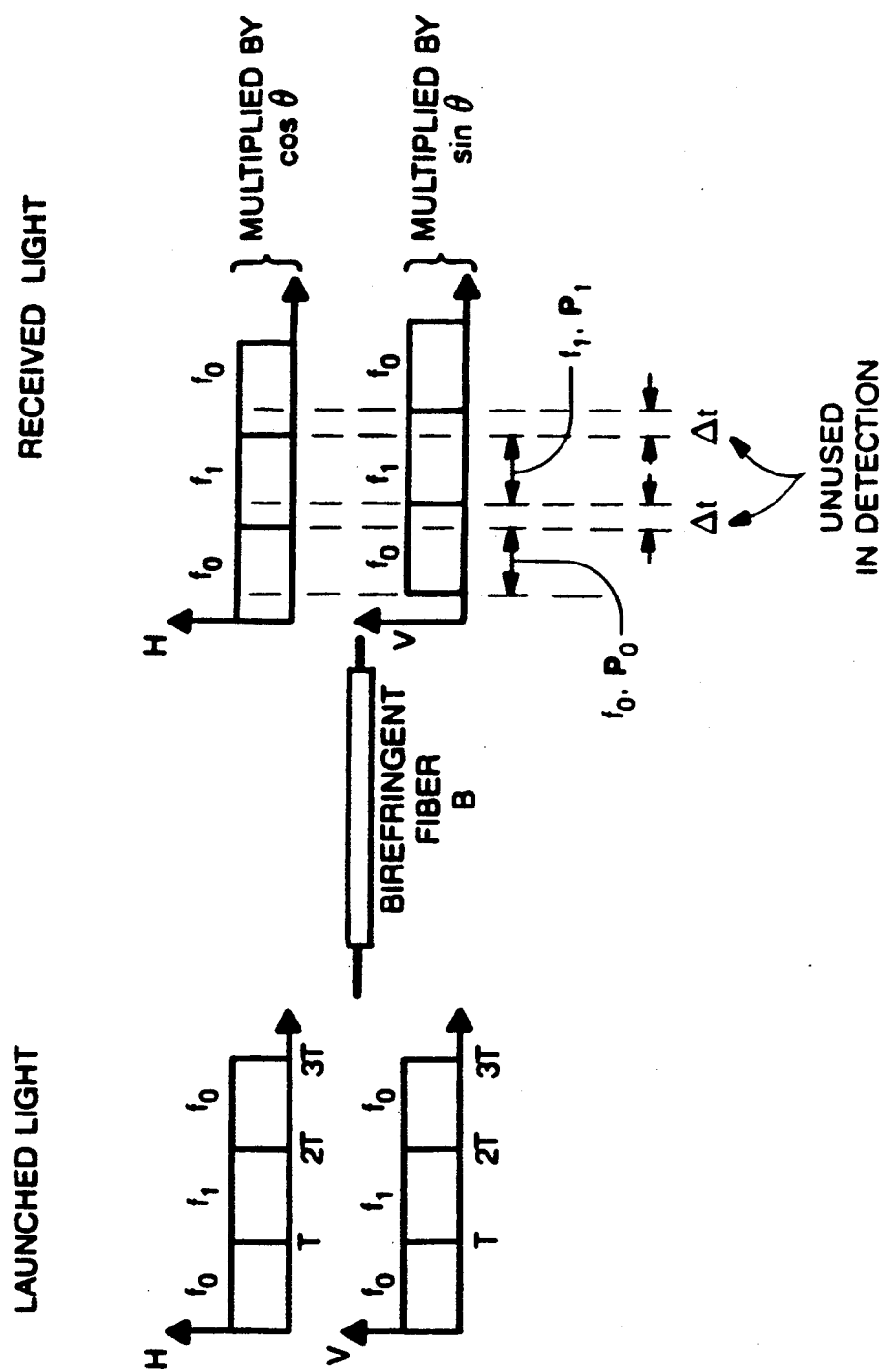

$$\rho = \tan^{-1} \frac{E_y}{E_x}$$

POLARIZATION-INSENSITIVE TECHNIQUE FOR COHERENT OPTICAL COMMUNICATION

This application is a continuation-in-part of U.S. patent application Ser. No. 145,446, filed on Jan. 19, 1988 now abandon, and U.S. patent application Ser. No. 145,358, filed on Jan. 19, 1988 now abandon. The disclosure in this application consists exclusively of the disclosures contained in those two applications.

FIELD OF THE INVENTION

This invention involves optical communications systems and techniques for polarization insensitive detection.

BACKGROUND OF THE INVENTION

An ideal circular single-mode fiber supports two modes with orthogonal polarizations and identical propagation constants. In such an ideal fiber, the state of polarization is maintained along its entire length. However, in real single-mode fibers, deviations from the ideal such as elliptic cores, twists or bends, and anisotropic stresses result in a difference in the propagation constants for these two modes. This induced briefringence leads to variations in the state of polarization of the transmitted light along the fiber. The state of polarization also changes slowly with time due to temperature and pressure changes (I. P. Kaminow, "Polarization in Optical Fibers", *IEEE J. Quant. Electron.*, Vol. QE-17, No. 1, Jan. 1981, pp. 15–22).

The unpredictability of the state of polarization presents a potentially severe detection problem in coherent optical communications systems. In order to exploit the potential advantages of these systems the polarization states of the received signal wave and the local oscillator wave must be matched (I. P. Kaminow, "Polarization in Optical Fibers", *IEEE J. Quant. Electron.*, Vol. QE-17, No. 1, Jan. 1981, pp. 15–22; and T. Okoshi, "Recent Advances in Coherent Optical Fiber Communication Systems", *J. Lightwave Tech.*, Vol. LT-5, No. 1, Jan. 1987, pp. 44–52). A mismatch may severely degrade the receiver sensitivity. In particular, when the polarization states are orthogonal, complete fading results.

We can quantify the effects of this mismatch by considering the signal-to-noise ratio (SNR) at the output of the IF filter in a typical coherent optical communications system (see FIG. 1). In the standard derivation of the performance of shot-noise-limited heterodyne detection, it is usually assumed that the signal and local oscillator fields have constant amplitude and matched phase over the detector surface and that they have the same state of polarization. With these assumptions, it is easy to show that $$SNR = \frac{\eta P_S}{h\nu W}, \tag{1}$$

where $\eta$ is the quantum efficiency of the detector, $P_S$ is the received optical signal power and $W$ is the noise bandwidth of the IF filter. If the above assumptions are relaxed, the SNR is then given by H. A. Haus, *Waves and Fields in Optoelectronics*, Prentice-Hall, 1984; and R. H. Kingston, *Detection of Optical and Infrared Radiation*, Springer-Verlag, 1979)

$$SNR = \frac{\eta P_S}{h\nu W} \cdot \frac{\left| \int_A E_{LO} \cdot E_S^* \, dA \right|^2}{\int_A E_S \cdot E_S^* \, dA \int_A E_{LO} \cdot E_{LO}^* \, dA} = \frac{\eta P_S}{h\nu W} \cdot m, \tag{2}$$

where A is the area of the detector and $E_S$ and $E_{LO}$ are the complex field amplitudes of the signal and local oscillator waves, respectively. The SNR in (2) is simply the ideal SNR in (1) modified by m, which is referred to as the "mixing efficiency". This mixing efficiency is a measure of the match between the incoming signal and local oscillator fields and will have some slowly-varying, random value between 0 and 1.

For the special case where the complex field amplitudes $E_S$ and $E_{LO}$ are constant over the detector area and where the angle between the local oscillator and signal polarizations (assumed linear) is $\theta$, the SNR in (2) reduces to $$SNR = \frac{\eta P_S}{h\nu W} \cos^2\theta. \tag{3}$$

The above expression for SNR is also valid for any state of polarization, if $\theta$ is appropriately defined. A derivation of the mixing efficiency for arbitrary states of polarization is given in Appendix A. For matched polarizations ($\theta=0°$), $\cos^2\theta=1$, and no sensitivity degradation is encountered. On the other hand, when the polarizations are orthogonal ($\theta=90°$), $\cos^2\theta=0$ and complete fading results, that is, no signal appears at the output of the IF filter. In general, the strength of the signal in the IF filter will vary slowly between these two extremes. It is therefore obvious that techniques must be employed to minimize or, if possible, eliminate this problem.

Several techniques have been proposed in the literature to handle the problem of polarization mismatch. These include the use of polarization-maintaining fibers, polarization-state controllers, polarization-diversity receivers (analogous to in-phase/quadrature radio receivers) and polarization-switching systems. Here we will concentrate on polarization-switching but, first, we will briefly review the non-polarization-switching methods for dealing with this problem (Section 2). Then (Section 3), several techniques based on polarization switching will be described. These schemes, which may be simpler to implement, all rely on forcing the polarization state of either the transmitted signal or the local oscillator to vary with time in a manner such that polarization-insensitive detection is possible. The result is a fixed level of detection performance, with a power penalty relative to ideal of 3 dB.

1. Non-Polarization-Switching Approaches

A. Polarization-Maintaining Fiber

An obvious solution for stabilizing the polarization state of the transmitted signal over the entire length of the fiber is the use of polarization-maintaining fibers (I. P. Kaminow, "Polarization Maintaining Fibers", *Applied Scientific Research*, Vol. 41, 1984, pp. 257–270; and J. Noda, K. Okamoto, Y. Sasaki, "Polarization-Maintaining Fibers and Their Applications:, *J. Lightwave*

*Tech.*, Vol. LT-4, No. 8, Aug. 1986, pp. 1071-1089). Polarization-maintaining fibers and other polarization-preserving devices needed in the network may become practical some day. However, the problems of high loss and polarization dispersion and the intricate alignment needed at every splice and connector (M. Monerie, "Polarization-Maintaining Single-Mode Fiber Cables: Influence of Joins", *App. Optics*, Vol. 20, No. 14, July 1981, pp. 2400-2406) make this approach difficult to implement. In addition, most of the existing optical wiring consists of standard fiber which would be costly to replace.

B. Polarization-State Controllers

Several techniques for actively controlling the state of polarization of the received signal and matching it to the local oscillator have been proposed in the literature (R. Ulrich, "Polarization Stabilization on Single-Mode Fiber", *App. Phys. Lett.*, Vol. 35, No. 11, Dec. 1979, pp. 840-842; M. Kubota et al, "Electro-optical Polarisation Control on Single-Mode Optical Fibres", *Electron Lett.*, Vol. 16, No. 15, July 17, 1980, p. 573; Y. Kidoh, Y. Suematsu, and K. Furuya, "Polarization Control on Output of Single-Mode Optical Fibers", *IEEE J. Quant. Electron.*, Vol. QE-17, No. 6, June 1981, pp. 991-994; H. C. Lefevre, "Single-Mode Fibre Fractional Wave Devices and Polarisation Controllers", *Electron. Lett.*, Vol. 16, No. 20, Sept. 25, 1980, pp. 778-780; T. Imai, K. Nosu, and H. Yamaguchi, "Optical Polarisation Control Utilising an Optical Heterodyne Detection Scheme", *Electron. Lett.*, Vol. 21, Jan. 17, 1985, pp. 52-53; T. Okoshi, Y. H. Cheng, and K. Kikuchi, "New Polarisation-Control Scheme for Optical heterodyne Receiver Using Two Faraday Rotators", *Electron. Lett.*, Vol. 21, No. 18, Aug. 29, 1985, pp. 787-788; and T. Ikoshi, N. Fukuya and K. Kikuchi, "A New Polarisation-State Control Device: Rotatable Fiber Cranks", *Electron. Lett.*, Vol. 21, No. 20, Sept. 26, 1985, pp. 895-896). These include the use of electromagnetic fiber squeezers (R. Ulrich, "Polarization Stabiliation on Single-Mode Fiber", *App. Phys. Lett.*, Vol. 35, No. 11, Dec. 1979, pp. 840-842), electro-optic crystals M. Kibota et al, "Electro-optical Polarisation Control on Single-Mode Optical Fibers", *Electron. Lett.*, Vol. 16, No. 15, July 17, 1980, p. 573; and Y. Kidoh, Y. Suematsu, and K. Furuya, "Polarization Control on Output of Single-Mode Optical Fibers", *IEEE J. Quant. Electron.*, Vol. QE-17, No. 6, June 1981, pp. 991-994), rotatable fiber coils (H. C. Lefevre, "Single-Mode Fibre Fractional Wave Devices and Polarisation Controllers", *Electron. Lett.*, Vol. 16, No. 20, Sept. 25, 1980, pp. 778-780), rotatable phase plates (T. Imai, K. Nosu, and H. Yamaguchi, "Optical Polarisation Control Utilising an Optical Heterodyne Detection Scheme", *Electron. Lett.*, Vol. 21, Jan. 17, 1985, pp. 52-53), Faraday rotators (T. Okoshi, Y. H. Cheng, and K. Kikuchi, "New Polarisation-Control Scheme for Optical Heterodyne Receiver Using Two Faraday Rotators", *Electron. Lett.*, Vol. 21, No. 18, Aug. 29, 1985, pp. 787-788) and rotatable fiber cranks (T. Okoshi, N. Fukuya, and K. Kikuchi, "A New Polarisation-State Control Device: Rotatable Fiber Cranks", *Electron. Lett.*, Vol. 21, No. 20, Sept. 26, 1985, pp. 895-896). For an excellent exposition of these methods and their limitations, see T. Okoshi, "Polarization-State Control Schemes for Heterodyne or Homodyne Optical Fiber Communications", *J. Lightwave Tech.*, Vol. LT-3, No. 6, Dec. 1985, pp. 1232-1237).

All of the polarization-state control schemes consist basically of two controlling elements (a polarization state has two degrees of freedom, namely, the ellipticity and the azimuth). By varying these two parameters, the controller tries to match the state of polarization of the received signal to that of the local oscillator (or, equivalently, the controller tries to maximize the mixing efficiency). To achieve this, usually four photodetectors are used in an electro-optic or electromechanical feedback arrangement.

The mechanical controllers tend to be bulky and slow (with a response time on the order of seconds), while the electro-optic controllers provide faster responses (milliseconds). Speed of response may not be a major issue in circuit-switched applications. However, for packet networks a faster response may be necessary. A limitation of all of these schemes, except for rotatable phase plates and rotatable fiber cranks, is that they cannot track changes in the polarization state in an endless fashion. When the polarization state changes beyond the tracking range of the controllers, they must be reset.

C. Polarization-Diversity Receivers

Another set of techniques, often called polarization-diversity receivers (T. Okoshi, "Heterodyne-type Optical Fiber Communications", IOOC'81", San Francisco, April 1981, p. 44; T. Okoshi, "Polarization-Diversity Receiver for heterodyne/Coherent Optical Fiber Communications", IOOC'83, June 1983, pp. 386-387; T. G. Hodgkinson, R. A. Harmon, and D. W. Smith, "Demodulation of Optical DPSK Using In-Phase and Quadrature Detection", *Electron. Lett.*, Vol. 21, No. 19, Sept. 12, 1985, pp. 867-868; and B. Glance, "Polarization Independent Coherent Optical Receiver", *J. Lightwave Tech.*, vol. LT-5, No. 2, Feb. 1987, pp. 274-276) or horizontal-vertical (H-V) receivers, is based on utilizing a receiver structure analogous to the in-phase/quadrature (I-Q) receiver (H. L. Van Trees, *Detection, Estimation and Modulation Theory, Part I*, John Wiley, 1968, pp. 335-348), which is the optimum detector for a received signal with random phase in additive white Gaussian noise. The performance of these receivers is independent of the polarization state of the received signal. A typical H-V receiver, similar to the radio I-Q receiver, is shown in FIG. 2. This receiver decomposes the sum of the signal and the local oscillator waves into two orthogonal components, for example, horizontal and vertical. Under normal operation, the local oscillator is linearly polarized and is launched at 45° to the principal axes of a polarizing beam splitter which splits the local oscillator evenly between the two branches. The output of the IF filter in the horizontal branch, $X_H$, is proportional to $\cos \theta$, where $\theta$ is the relative angle between the received signal state of polarization and the corresponding axis of the polarizing beam splitter. Similarly, the output of the vertical branch, $X_V$, is proportional to $\sin \theta$. If, for example, the received signal happens to be vertically polarized, then no signal goes through the horizontal branch while the entire signal goes through the vertical branch. In general, if the received state of polarization varies, then one output will increase while the other decreases so that the output, $X_H^2 + X_V^2$, is independent of $\theta$ and polarization-insensitive detection is achieved. In addition, if the local oscillator power in the individual branches is sufficient to guarantee shot-noise-limited performance, then an SNR close to that of an ideal heterodyne receiver can be obtained. This approach has been analyzed and shown to work for optical DPSK (T. G. Hodgkinson, R. A. Harmon, and D. W. Smith, "Demodulation of Optical DPSK Using In-Phase and Quadrature Detection", *Electron. Lett.*, Vol. 21, No. 19, Sept. 12, 1985, pp. 867–868; and B. Glance, "Polarization Independent Coherent Optical Receiver", *J. Lightwave Tech.*, Vol. LT-5, No. 2, Feb. 1987, pp. 274–276) and for optical FSK (D. Kreit and R. C. Youngquist, "Polarization-Insensitive Optical Heterodyne Receiver for Coherent FSK Communications", *Electron. Lett.*, Vol. 23, No. 4, Feb. 12, 1987, pp. 168–169).

Some disadvantages arise in using H-V receivers. First, the implementation of these receivers requires a duplication of the receiver circuitry, including the use of two photodetectors. Second, polarizing beam splitters are needed to decompose the signal. Although polarizing beam splitters have been constructed as research devices with single-mode fiber technology (for example, see (A. J. Noda et al, "Single-Mode Fiber Devices", *Optoelectronics-Devices and Technologies*, Vol. 1, No. 2, Dec. 1986, pp. 175–194)), they are rather high-loss devices ($\approx 2$ dB) and are not available commercially. Also, the structures proposed in (A. J. Noda et al, "Single-Mode Fiber Devices", *Optoelectronics-Devices and Technologies*, Vol. 1, No. 2, Dec. 1986, pp. 175–194) are highly frequency-dependent, which may limit their widespread use.

SUMMARY OF THE INVENTION

This invention is an optical communication system in which optical detection is insensitive to mismatches between the polarization states of the received optical signal and, for example, a local oscillator. In the inventive technique, a polarization switching or scrambling scheme is used to force the polarization state of either the transmitted signal or local oscillator to vary in time in a non-adaptive manner so that polarization-independent detection is obtained (T. G. Hodgkinson, R. A. Harmon, and D. W. Smith, Polarization Insensitive Heterodyne Detection Using Polarization Scrambling", *Electronics Letters*, Vol. 23, No. 10, May 7, 1987, pp. 513–514). This is analogous to averaging overfades in a radio embodiment by converting a slow fading situation to a fast fading one (L. J. Cimini, Jr., "Analysis and Simulation of a Digital Mobile Channel Using Orthogonal Frequency Division Multiplexing", IEEE Trans. Commun., Vol. COM-33, No. 7, July 1985, pp. 666–675). Accordingly, instead of having to contend with a value of m which is fixed during the bit period (between 0 and 1) and which yields unacceptable performance, we have an average mixing efficiency $\bar{n}$ (averaged over a bit period). This averaging causes a fixed degradation in performance. Several such polarization insensitive techniques requiring only a single photodetector will be described.

A specific embodiment of the invention involves a particularly simple application of the inventive polarization-insensitive technique. In that embodiment, a combination of frequency and polarization modulation is used. In this specific embodiment, the frequency shift of the transmitted signal is used to induce the polarization switching by introducing a passive device with birefringence in the path of the transmitted signal. The polarization switching causes a 3 dB power penalty when compared to an ideal frequency shift keying (FSK) system but provides for polarization-insensitive protection. An advantage of this technique is that it is particularly well suited to local area networks because of the simple receiver design. Generally, the invention involves mixing two optical signals, at least one of which comprises a bit stream representative of intelligence which is transmitted at a given bit rate, the polarization of at least one of the signals varying independently of the polarization of the other signal at a rate slower than the given bit rate, and the polarization of the other of the two signals being caused to vary at a rate greater than or equal to the bit rate.

BRIEF DESCRIPTION OF THE DRAWING

FIG. 4 is a representation of polarization switching. The polarization state of the local oscillator is switched between two orthogonal states during a bit period. In the first half of the bit, the output, s(t), is proportional to $\cos \theta$ ($\theta = \theta_s - \theta_{LO}$) and in the remaining half the output is proportional to $\sin \theta$. Thus, the received signal energy, $\epsilon = \frac{1}{2}$, and a signal level independent of the state of polarization of the received signal is achieved. The received signal energies for conventional heterodyne detection are shown for comparison;

FIG. 7 is a representation of polarization modulation/switching. By appropriately choosing the polarization angle for a mark (1) and a space (0), we can combine modulation and switching in a single device;

FIG. 13 is a representation of ISI with frequency-shift-based implementations. An FSK signal is sent at 45° to the principal axes. The pulses at the input are decomposed into horizontal and vertical components which travel at different speeds. After traveling through a birefringent fiber, the pulses appear as shown. The region of overlap, $\Delta t = kT$, is regarded here as ISI and is unused in detection;

DETAILED DESCRIPTION

Figure 1:
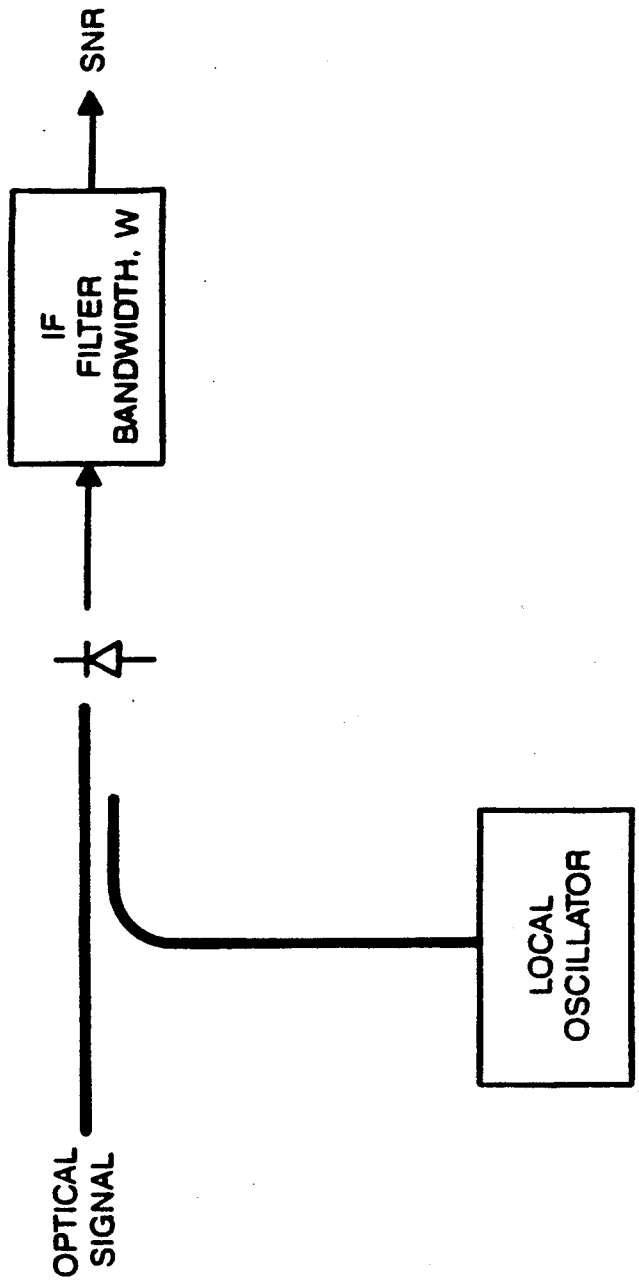
FIG. 1 is a representation of a coherent optical communication system.
Figure 2:
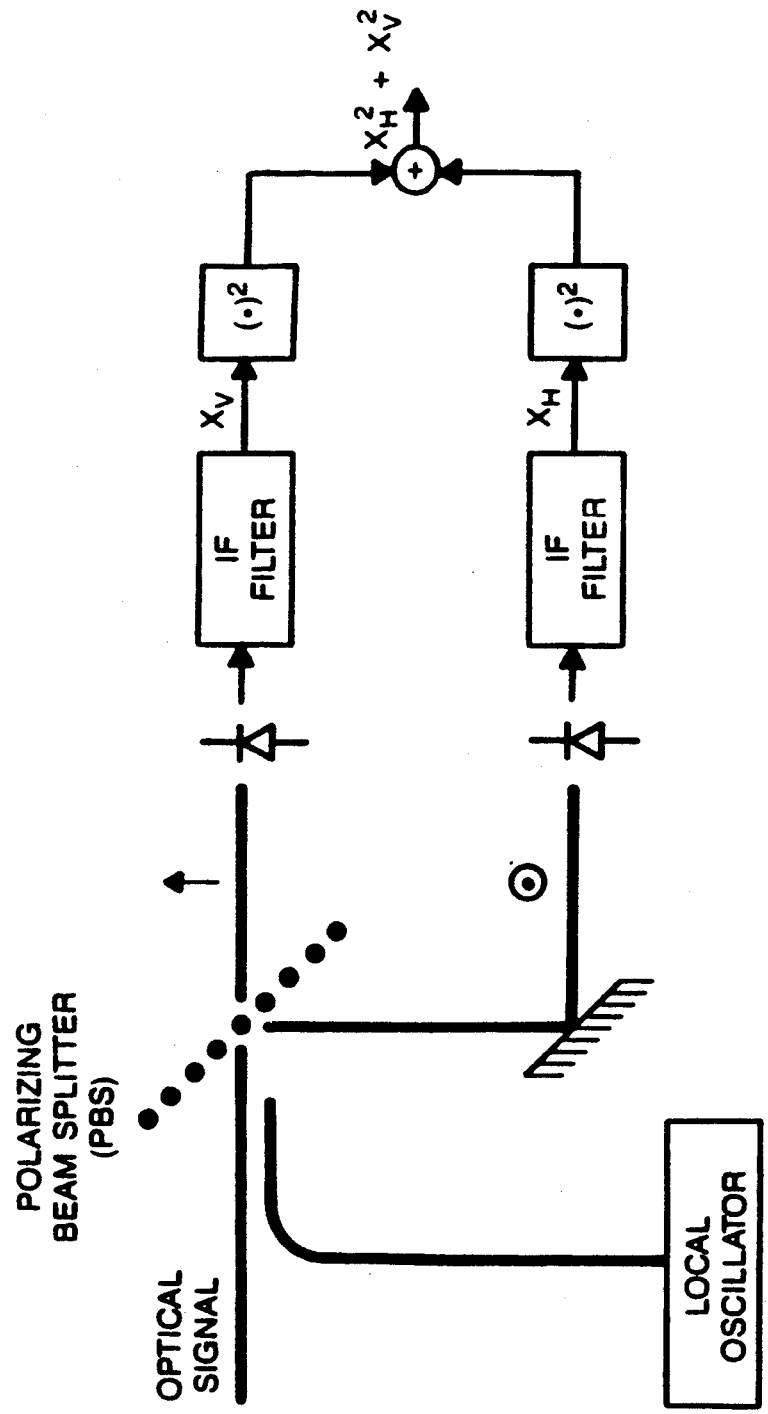
FIG. 2 is a representation of a polarization-diversity (H-V) receiver. This receiver decomposes the sum of the signal and the local oscillator waves into two orthogonal components, for example, horizontal and vertical. The two outputs are heterodyne-detected separately and combined so that polarization-insensitive detection is achieved.
Figure 3A:
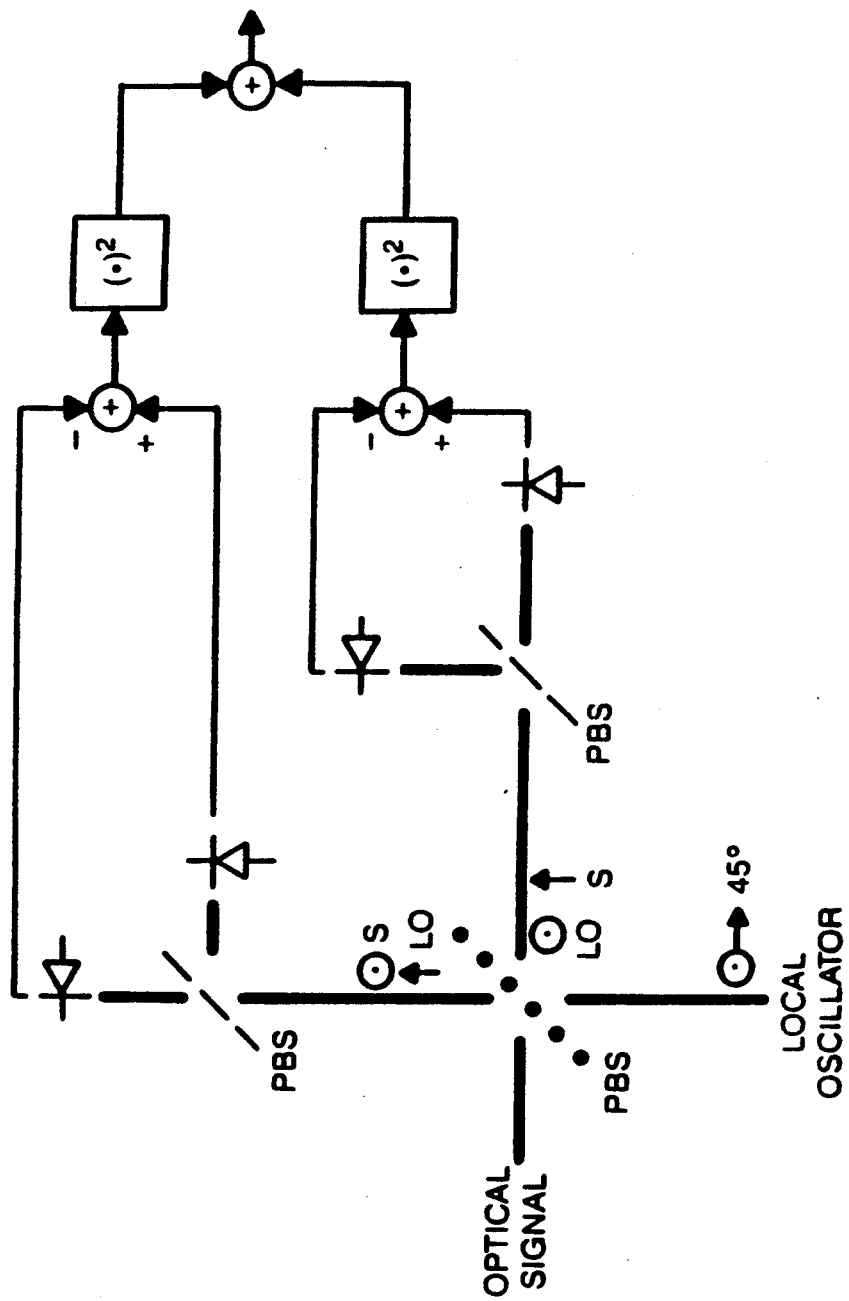
FIGS. 3a and 3b are a representation of four-photodetector polarization-diversity receivers.
Figure 3B:
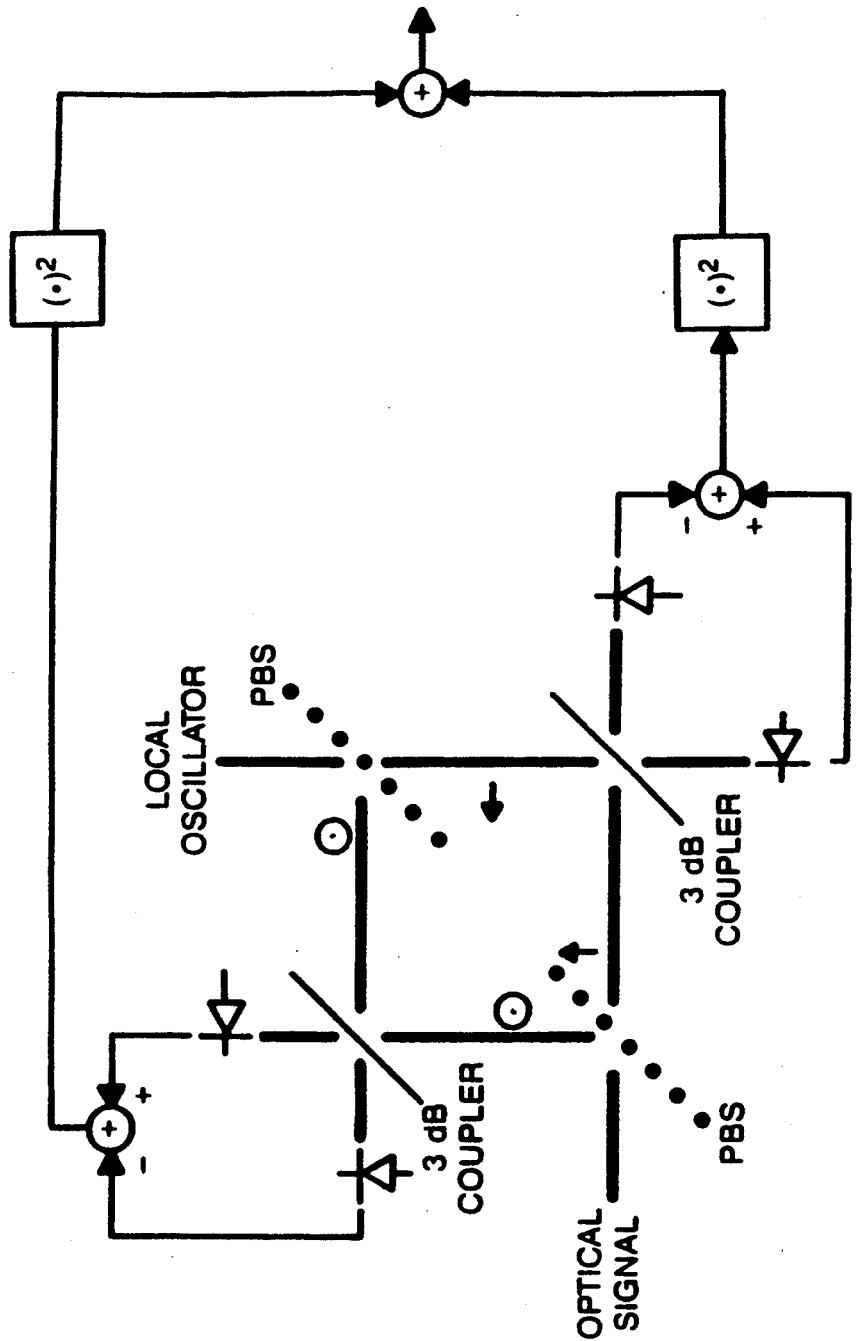

The invention is an optical communications system in which a polarization-switching or scrambling scheme is used to force the polarization state of either the transmitted signal or local oscillator to vary with time so that polarization independent detection is obtained.

In this discussion, we will concentrate on techniques which change the state of polarization in a discrete (and deterministic) manner. In general, the polarization can be changed in a discrete/continuous and deterministic/- random fashion. Ideally, the range over which the polarization changes should cover two orthogonal states during a bit period. Assume that both the received signal and local oscillator are linearly polarized at angles of $\theta_S$ and $\theta_{LO}$, respectively. A measure of the performance of any communication system is the received signal energy, $\epsilon$, given by $$\xi = \frac{1}{T} \int_0^T s^2(t)dt \tag{4}$$

where s(t) is the received signal and T is the bit period. In what follows, we normalize the received energy so that for perfect heterodyne reception ($\theta_S = \theta_{LO}$)

$$\epsilon = 1. \tag{5}$$

On the other hand, in a real heterodyne system without polarization control $\theta_S \neq \theta_{LO}$ and, as shown previously, $$\epsilon = \cos^2(\theta_S - \theta_{LO}), \tag{6}$$

which is not acceptable due to the potential for fading. The above two cases are shown in FIG. 4.

Now, assume that the polarization state of the local oscillator is switched between two orthogonal states during a bit period (see FIG. 4). The signal with polarization angle $\theta_S$ is mixed with the local oscillator with polarization angle $\theta_{LO}$ during one half of the bit period, and during the other half it is mixed with a local oscillator with polarization angle ($\theta_{LO} + \pi/2$). In the first half of the bit the output is proportional to $\cos \theta$ ($\theta = \theta_S - \theta_{LO}$) and in the remaining half the output is proportional to $\cos (\theta - \pi/2) = \sin \theta$. Assuming that $\theta_S$ and $\theta_{LO}$ are constant over a bit period (that is, the variation in either polarization state is very slow compared to the bit rate), the received signal energy is $$\xi = \frac{1}{T} \left[ \int_0^{T/2} \cos^2\theta dt + \int_{T/2}^T \sin^2\theta dt \right] = \frac{1}{2} \tag{7}$$

and a signal level independent of the state of polarization of the received signal is achieved. Since the detection process for the polarization-switching system is the same as for the non-switching case, the noise contribution is the same, and (7) implies that the polarization switching scheme suffers a fixed 3 dB loss in SNR when compared with ideal heterodyne reception (5).

Note that, in general, the switching need not be synchronized with the received data. However, the switching rate should be an even integer multiple of the bit rate. Also, neither the received signal nor the local oscillator needs to be linearly polarized. An additional advantage of polarization-switching is that it can be used with any modulation technique that can be noncoherently demodulated (for example, ASK, FSK or DPSK).

1. Transmitter vs Receiver Switching

Polarization switching can be used at the receiver to achieve polarization-insensitive detection. However, if the state of polarization is switched at the transmitter, then we have to consider the possible loss of orthogonality along the fiber, and whether this is severe enough to prevent the polarization-switching approach from being implemented at the transmitter. If two waves with orthogonal polarizations are launched into a fiber, then, in general, they will not remain orthogonal. The angle $\delta$ between the polarization states at the output is no longer 90° but is bounded by the following expression:

$$\cos\delta \leq \frac{T_{max} - T_{min}}{T_{max} + T_{min}} = \gamma \tag{8}$$

where $T_{max}$ and $T_{min}$ are the maximum and minimum power transfer coefficients as the input polarization state is varied. A formal proof of (8), which is valid for all states of polarization, is given in Appendix B.

The fact that the loss in orthogonality in any linear optical medium is only related to the maximum and minimum power transfer coefficients is not intuitive. The relationship in (8) is very useful because the maximum and minimum power transfer coefficients are readily measurable. Preliminary loss measurements for dispersion-shifted fibers of lengths 4–50 km have indicated that $\gamma$ in (8) is less than 0.01. This implies very little loss in orthogonality (less than 1°). Similar measurements have been made for 150 km lengths of standard fiber. These measurements indicate a loss in orthogonality of less than 6°. The same bound applies when using any device with coupling anisotropy (for example, a directional coupler). In particular, when implementing a local area network using a 1024×1024 star coupler made up many 3-dB 2×2 couplers (10-stage network), we find, using (8) and typical data (with polarization-dependent coupling of 50%±0.27%), that the worst-case degradation from orthogonality is still less than 4°.

In general, the degradation encountered due to the loss of orthogonality while switching the polarization state of either the transmitted signal or the local oscillator depends on the relative angle between the two. This creates an additional penalty beyond the 3 dB indicated in (7). The worst-case additional penalty is equal to $\sin^2\delta$. For example, for a degradation from orthogonality of 4° ($\delta = 86°$) almost no additional penalty is encountered. In particular, if we can tolerate an additional penalty of 0.5 dB, then the loss of orthogonality can be as much as 19°. Based on the above, the loss of orthogonality is not a major problem and therefore, polarization switching could be implemented at the transmitter.

2. Implementations

A. Two-Branch Approach

Figure 5:
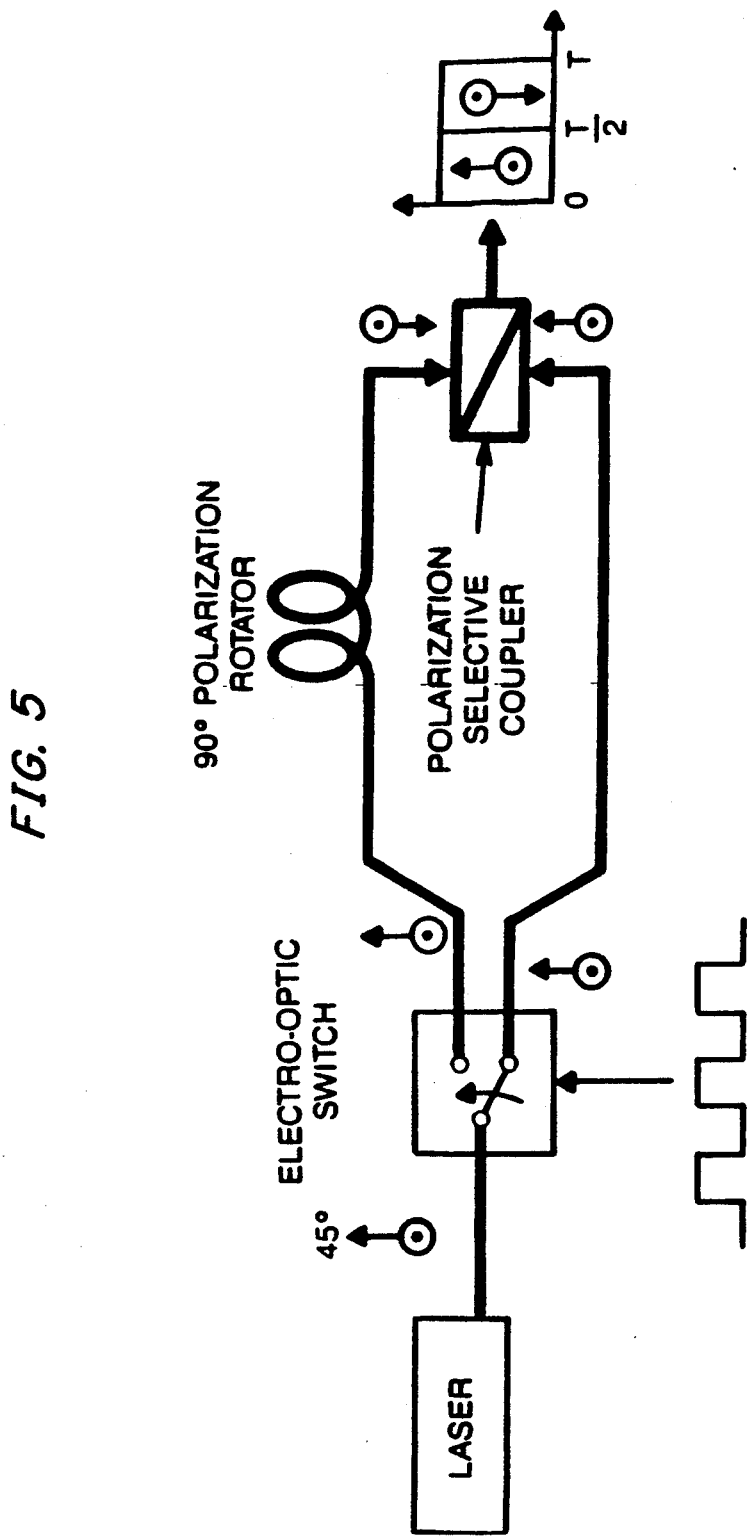
FIG. 5 is a representation of two-branch polarization switching; Using an external electro-optic device, the laser is periodically switched between two paths, one of which rotates the polarization by 90°. The output of the polarization-selective coupler is an optical signal whose polarization switches between two orthogonal states during a bit period.

As described above, it is desirable to switch the polarization of either the transmitted signal or local oscillator between two orthogonal states during a bit period. One way to do this is shown in FIG. 5. Using an external electro-optic device, the laser is periodically switched between two paths, one of which rotates the polarization by 90°. The output of the polarization selective coupler is an optical signal whose polarization switches between two orthogonal states during a bit period.

Figure 6:
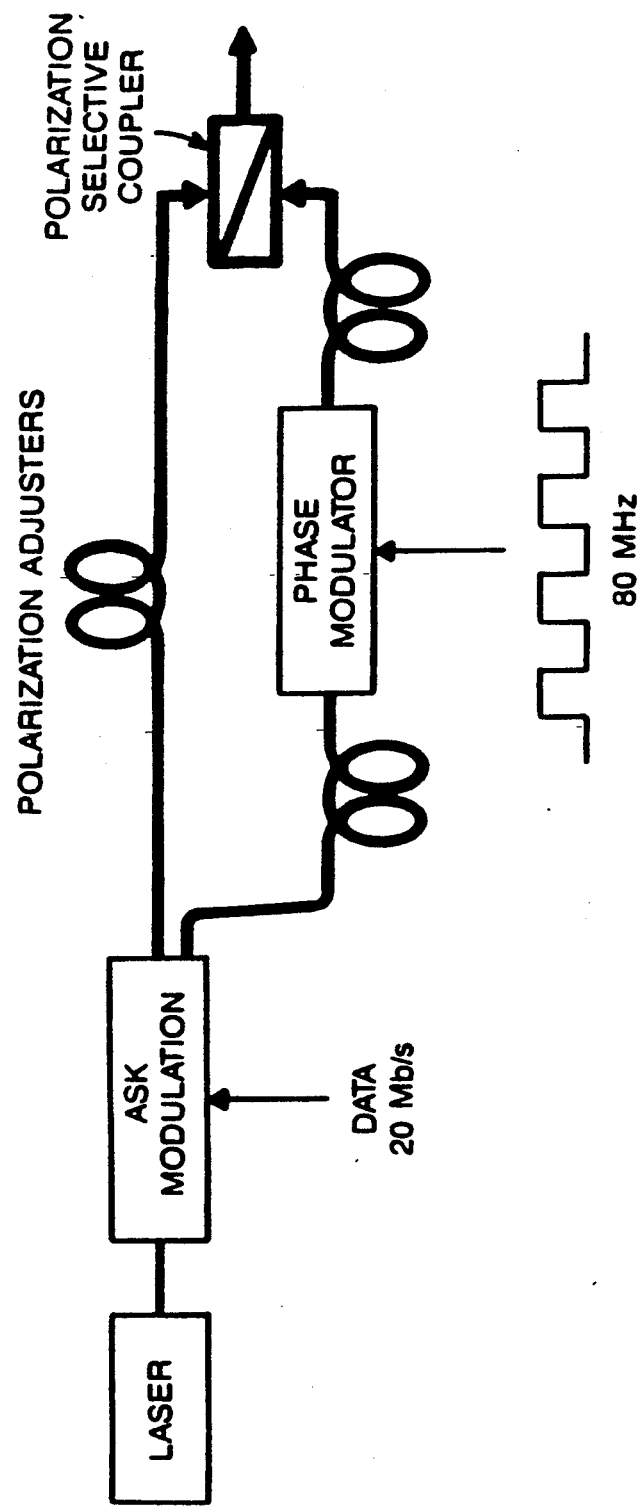
FIG. 6 is a representation of polarization scrambling. The polarization state of the transmitted signal is scrambled after ASK modulation. A phase modulator in one branch of a Mach-Zehnder interferometer is used to make the polarization of the transmitted ASK signal rapidly alternate between two orthogonal states.

A scheme which scrambles the polarization state of the transmitted signal after ASK modulation is shown in FIG. 6 (T. G. Hodgkinson, R. A. Harmon, and D. W. Smith, "Polarisation Insensitive Heterodyne Detection Using Polarisation Scrambling", *Electron. Lett.*, Vol. 23, No. 10, May 7, 1987, pp. 513–514). The scheme shown in FIG. 6 uses a phase modulator in one branch of a Mach-Zehnder interferometer to make the polarization of the transmitted ASK signal rapidly alternate between two orthogonal states. An experiment was reported in (T. G. Hodgkinson, R. A. Harmon, and D. W. Smith, "Polarisation Insensitive Heterodyne Detection Using Polarisation Scrambling", *Electron. Lett.*, vol. 23, No. 10, May 7, 1987, pp. 513–514) which verified the 3 dB loss encountered due to the switching. For this particular experiment, the state of polarization was switched at four times the bit rate.

B. Polarization Modulators

A more desirable alternative would be to implement the polarization-switching described in Section 3.1 with a single device. Ti:LiNbO$_3$ polarization modulators (R. C. Alferness and L. L. Buhl, "Electro-optic Waveguide TE-TM Mode Converter with Low Drive Voltage", *Optics Lett.*, Vol. 5, No. 11, Nov. 1980, pp. 473–475; R. C. Alferness, "Electrooptic Guided-Wave Device for General Polarization Transformations", *IEEE J. Quant. Electron.*, Vol. QE-17, No. 6, June 1981, pp. 965–969; R. C. Alferness and L. L. Buhl, "High-speed Waveguide Electro-optic Polarization Modulator", *Optics Lett.*, Vol. 7, No. 10, Oct. 1982, pp. 500–502; and R. C. Alferness and L. L. Buhl, "Loss Loss, Waveguide Tunable, Waveguide Electro-optic Polarization Controller for $\lambda=1.32$ $\mu$m" *App. Phys. Lett.*, Vol. 47, No. 11, Dec. 1985, pp. 1137–1139) could be useful for this purpose. These devices have also been proposed for use as active polarization state controllers. With these devices the modulation and switching functions may be combined in a single device.

C. Birefringence-Based Polarization-Switching Techniques

Ideally, we would like to force the laser itself to switch its polarization between two orthogonal states by applying some external signal. Some experiments with Nd:YAG and He-Ne lasers (D. G. Carlson, and A. E. Siegman, "Intracavity Electrooptic Frequency Tuning, Polarization Switching, and Q-Switching of a Nd:YAG Laser Oscillator", *IEEE J. Quant. Electron.*, Vol. QE-4, No. 3, March 1968, pp. 93–98; and S. T. Hendow et al, "Observation of Bistable Behavior in the Polarization of a Laser", *Optics Lett.*, Vol. 7, No. 8, Aug. 1982, pp. 356–358) have indicated that a bistability can occur in the polarization state of the laser output if birefringence is present inside the cavity. The laser can then be made to switch between two orthogonal states. Similar experiments have been performed with semiconductor lasers (Y. C. Chen and J. M. Liu, "Polarization Bistability in Semiconductor Lasers", *Optics Lett.*, Vol. 7, No. 8, Aug. 1982, pp. 356–358). However, the need for birefringence inside the cavity further complicates the current problems in fabricating semiconductor lasers.

One solution is to simply place the birefringence outside the laser, for example, in the form of a high-birefringence fiber. Several techniques for polarization switching using birefringent fiber will be described in this subsection. However, before describing these techniques, we present some characteristics of birefringent fibers which will be useful later on.

C.1 Properties of Birefringent Fiber

A single-mode fiber can propagate two principal modes. Each of these modes has associated with it a refractive index ($n_x$ and $n_y$) and a propagation constant ($\beta_x$ and $\beta_y$). In an ideal circular fiber, the modes are degenerate (that is, $\beta_x=\beta_y$) while in a real fiber this degeneracy is removed (that is, $\beta_x \neq \beta_y$). A measure of this non-degeneracy is the birefringence, B, defined as $$B = \frac{\beta_x - \beta_y}{2\pi/\lambda} = n_x - n_y. \tag{9}$$

The difference in the propagation constants causes the fiber to exhibit linear phase retardation $\Phi(z,\lambda)$ which depends on the length of the fiber in the z direction and is given by $$\Phi(z,\lambda) = (\beta_x - \beta_y)z = \frac{2\pi B}{\lambda} z \tag{10}$$

Figure 8:
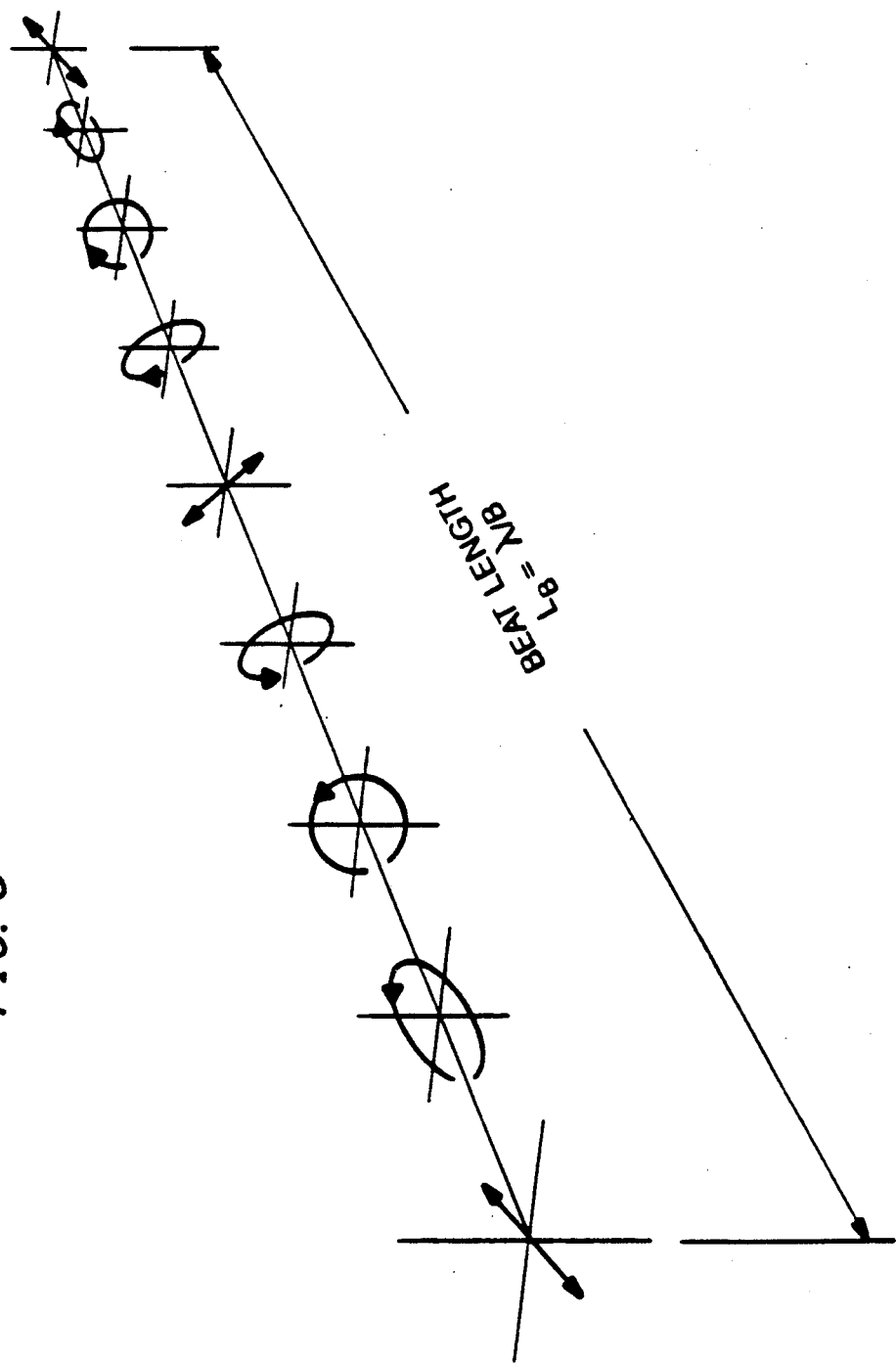
FIG. 8 is a representation of the evolution of the polarization state along a birefringent fiber. For incident light which is linearly polarized and launched at 45° to the principal axes of the fiber, the state of polarization evolves periodically. The period with which the polarization state changes is defined as the best length, $L_B$.

This phase retardation leads to a polarization state which is generally elliptical but which varies periodically along the fiber. If the incident light is linearly polarized and is launched at 45° to the principal axes, the state of polarization evolves periodically as shown in FIG. 8 (I. P. Kaminow, "Polarization in Optical Fibers", *IEEE J. Quant. Electron.*, Vol. QE-17, No. 1, Jan. 1981, pp. 15–22). The period with which the polarization state changes is defined as the beat length, $L_B=\lambda/B$. In the following, we will assume that B is independent of wavelength.

Figure 9:
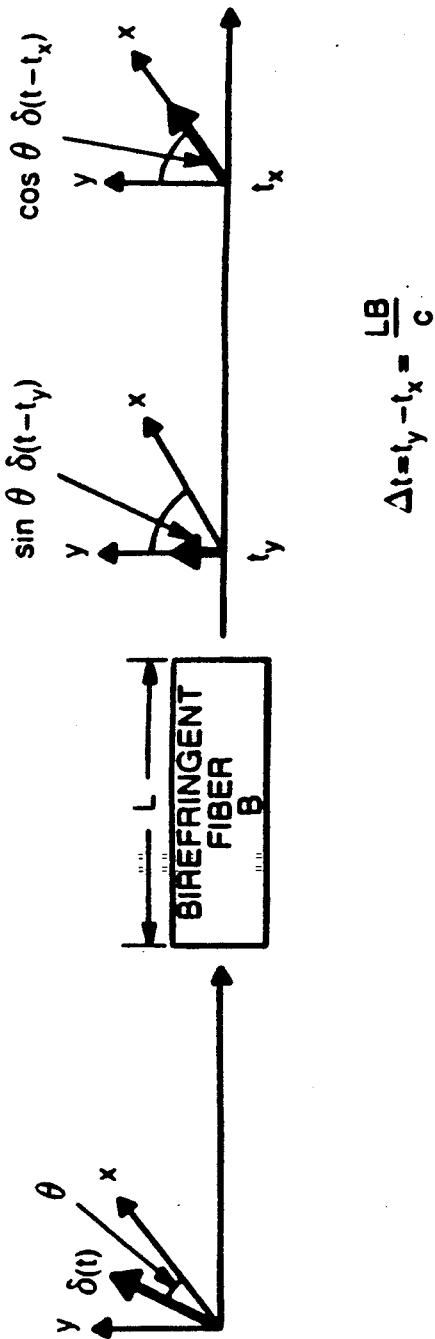
FIG. 9 is a representation of the impulse response of a birefringent fiber. The response is shown for an impulse $\epsilon(t)$ applied at the input of a birefringent fiber of length L at an angle $\theta$ to the principal axes.

The birefringent fiber just described can be modeled as a linear system. For an impulse, $\delta(t)$, applied at the input of a birefringent fiber of length L at an angle $\theta$ to the principal axes (x and y), the output (impulse response) is $$h(t) = \cos\theta\delta(t-t_x)x + \sin\theta\delta(t-t_y)y \tag{11}$$

where $t_x=Ln_x/c$ and $t_y=Ln_y/c$ (S. E. Harris and E. O. Ammann, "Optical Network Synthesis Using Birefringent Crystals", IEEE Proc., Vol. 52, No. 4, Apr. 1964, pp. 411–412). This impulse response is shown in FIG. 9.

C.2 Frequency-Switching the Local Oscillator

The beat length, $L_B$, is a function of wavelength. With a fiber of length L, the polarization state at the output varies when the wavelength (frequency) of light launched at 45° to the principal axes is changed. (The light is launched at 45° to ensure that the modes are excited equally and to make sure that the changes in polarization along the fiber cover two orthogonal states.) By periodically switching between two wavelengths, judiciously chosen, the polarization state of the output light can be switched between two orthogonal states. For example, let the input wavelengths be $\lambda_0$ and $\lambda_1$ with the associated output polarizations, $P_0$ and $P_1$. For $P_0$ and $P_1$ to be orthogonal, the following condition must be satisfied* A formal proof of (12) is given in Appendix C.

$$\Phi(L,\lambda_1) - \Phi(L,\lambda_0) = \pi. \tag{12}$$

Using (10) in (12), we get $$2\pi LB\left(\frac{1}{\lambda_1} - \frac{1}{\lambda_0}\right) = \pi$$

which gives $$L = \frac{1}{2B} \frac{\lambda_0 \lambda_1}{\lambda_0 - \lambda_1} \approx \frac{\lambda^2}{2B\Delta\lambda} = \frac{c}{2B\Delta f}. \quad (13)$$

Figure 10:
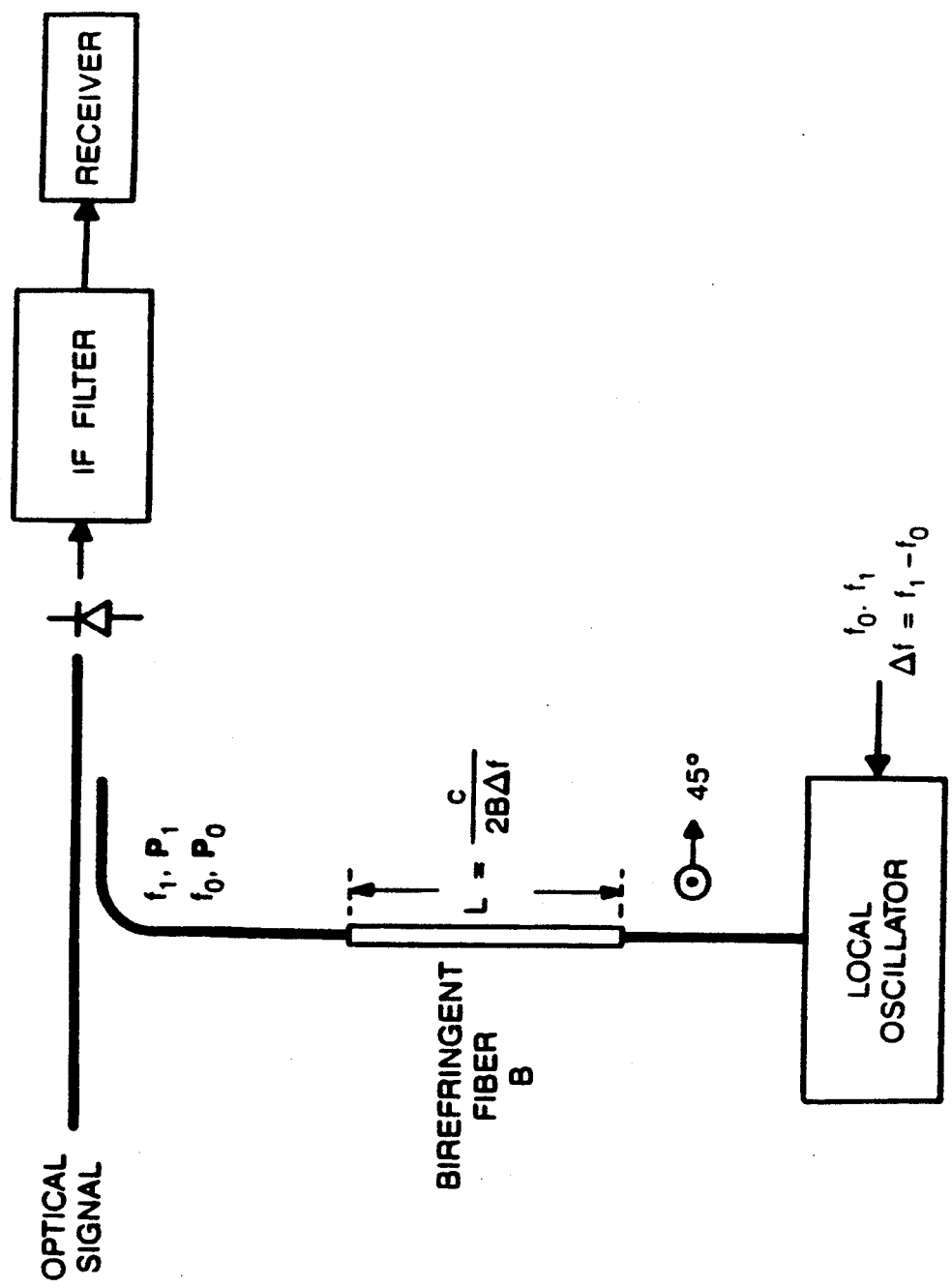
FIG. 10 is a representation of frequency switching the local oscillator. With a fiber of length, L, the polarization state at the output varies when the wavelength (frequency) of light launched at 45° to the principal axes is changed. By periodically switching between the two wavelengths, judiciously chosen, the polarization state of the output light can be switched between two orthogonal states. The IF frequency can be fixed at $f_{IF} = \Delta f/2$ by choosing the signal center frequency to be $f_s = (f_0 + f_1)/2$.
Figure 11:
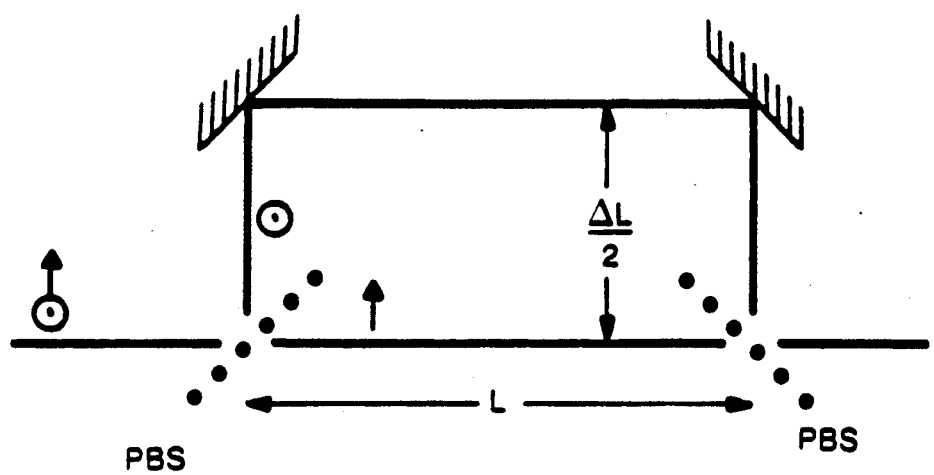
FIG. 11 is a representation of a birefringence simulator. Light launched at 45° to the principal axes of the polarizing beam splitter is separated into horizontal and vertical components. These components travel different distances and are combined again in a polarization-selective coupler with different phases. Thus, this assembly simulates a birefringent medium.

Based on (13), for a given fiber length, L, and birefringence, B, we can implement polarization-switching at the local oscillator by alternating between two frequencies (separated by $\Delta f$) during a single bit period. A polarization switching system based on (13) is shown in FIG. 10. As an example, let $B=5\times 10^{-4}$, which is representative of highly-birefringent fiber. For this case, $L\Delta f=3\times 10^{11}$ m/s and, therefore, for a frequency deviation $\Delta f=1$ GHz, the length of fiber $L=300$ m, which is not unreasonable. If a decrease in L is desired, we have to increase $\Delta f$ which may be difficult, or increase B. One way of simulating such a large birefringence with bulk optics is shown in FIG. 11. This structure involves a more difficult alignment than using a single piece of birefringent fiber. However, it offers the potential of developing a small single-mode fiber device to replace the long, high-birefringence fiber.

A system using frequency-switching at the local oscillator to implement polarization-switching can be used with ASK, FSK, and DPSK modulations. One disadvantage is that, in general, the IF frequency will be changing during the bit period. For ASK and DPSK, this problem can be remedied by choosing the frequencies so that the signal center frequency $f_S=(f_0+f_1)/2$. In this case, the IF frequency is fixed at $f_{IF}=(f_1-f_0)/2$. A similar condition can be found for FSK transmission. Of course, the frequency tracking problems at the local oscillator will be accentuated.

As an alternative to switching the frequency of the local oscillator, which requires countermeasures to stabilize the IF, we can use a frequency/polarization diversity scheme in which the local oscillator outputs two frequencies with a separation $\Delta f$ determined from (13) (either a dual-frequency laser or two local oscillators). With the local oscillator output launched into a birefringent fiber as before, the output of the photodetector is composed of two IF frequencies separated by $\Delta f$. These can then be detected and combined to give performance independent of the state of polarization of the received signal. This combination can be easily achieved if the frequency separation $\Delta f$ is much greater than the bit rate.

C.3 FSK at the Transmitter

Figure 12:
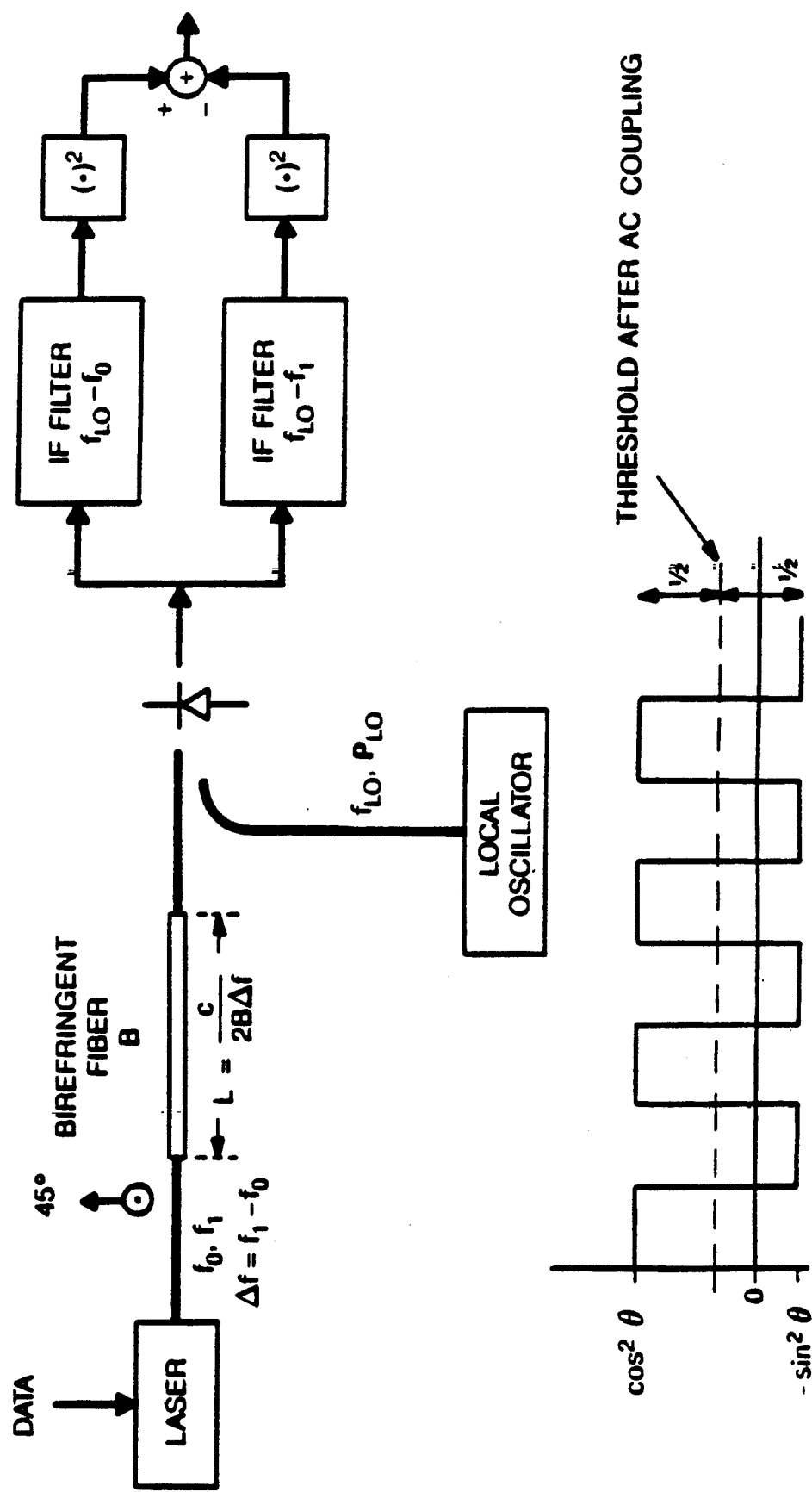
FIG. 12 is a representation of FSK at the transmitter. At the transmitter a space (0) is sent as $f_0$ and a mark (1) as $f_1$. These frequencies are chosen so that $f_0$ corresponds to a polarization state at the output of the birefringent fiber. $P_0$, and $f_1$ corresponds to $P_1$, where $P_1$ and $P_0$ are orthogonal states. The effect of AC coupling is indicated.

In the previous subsection, we switched the polarization state of the local oscillator. It is possible to switch the polarization state of the transmitter laser and modulate it externally. An alternative scheme combines polarization switching with FSK data modulation as shown in FIG. 12. Strictly speaking, this is not polarization switching as described before, because the polarization is not switched twice per bit but is switched at the bit rate. In particular, this is more like combined frequency and polarization modulation. At the transmitter a space (0) is sent as $f_0$ and a mark (1) as $f_1$. These frequencies are chosen as in the previous section so that $f_0$ corresponds to a polarization state at the output of the birefringent fiber, $P_0$, and $f_1$ corresponds to $P_1$ and $P_0$ are orthogonal states. When FSK is performed at the transmitter, then, at the receiver, we get $f_0$ with polarization $P_0$ and $f_1$ with polarization $P_1$.

Assume that a space (0) is sent and that the angle between the local oscillator polarization and $P_0$ is $\theta$. The output of the receiver in FIG. 12 is proportional to $\cos^2\theta$. Assume now that a mark (1) is sent, the output is then proportional to $-\sin^2\theta$. Thus, when data is sent, the separation between the two levels (eye opening) corresponding to a mark and a space ($\cos^2\theta-(-\sin^2\theta)=1$) remains fixed. However, if the received polarizations drift (that is, if $\theta$ changes), the signal variation is then superimposed on a slowly varying DC bias. This slow variation can be tracked out by AC coupling, as shown in FIG. 12. Because the signal separation is independent of $\theta$, this detection operation is polarization-insensitive, suffering a power penalty of 3 dB when compared with ideal heterodyne detection.

For all of the frequency-shift-based birefringent techniques, the difference in the propagation constants along the principal axes causes a given data pulse to interfere with adjacent pulses and thus gives rise to intersymbol interference (ISI). This is illustrated in FIG. 13. The time difference between the two components of the pulse along the principal axes (or, equivalently, the pulse overlap region), after traveling for L meters, is $$\Delta t = \frac{Ln_x}{c} - \frac{Ln_y}{c} = \frac{LB}{c}. \quad (14)$$

Thus, from (13) and (14), $\Delta t \Delta f = \frac{1}{2}$. For example, for $\Delta f=1$ GHz, $\Delta t=0.5$ ns which results in significant ISI if the transmission is at 1 Gb/s. For this case, half of the received pulse cannot be used for detection. Since this is known ISI, it may be possible to combat it by precoding the data, but this may not be an attractive solution at high speeds. To ensure that ISI is not a problem without taking any other measures, we can choose $\Delta t << T$ which implies that $\Delta f >> f_b/2$, where $f_b$ is the bit rate. That is, one can use large modulation index FSK. In any case, this is a required condition for dual-filter detection.

A consequence of the relationships for $\Delta t$ and $\Delta f$ is that there is a tradeoff between power and spectral efficiencies. Assuming that $\Delta t=kT$ we obtain a relative power efficiency $$\eta_{power}=1-k, \quad (15)$$

that is, due to the pulse overlap, a fraction k of the transmitted power is not used in the detection process (see FIG. 13). The spectral efficiency, using Carson's rule for the transmitted bandwidth, is approximated by $$\eta_{freq} = \frac{f_b}{W} \approx \frac{1}{1+\frac{1}{2k}} = \frac{1}{1+\frac{1}{2(1-\eta_{power})}}. \quad (16)$$

Figure 14:
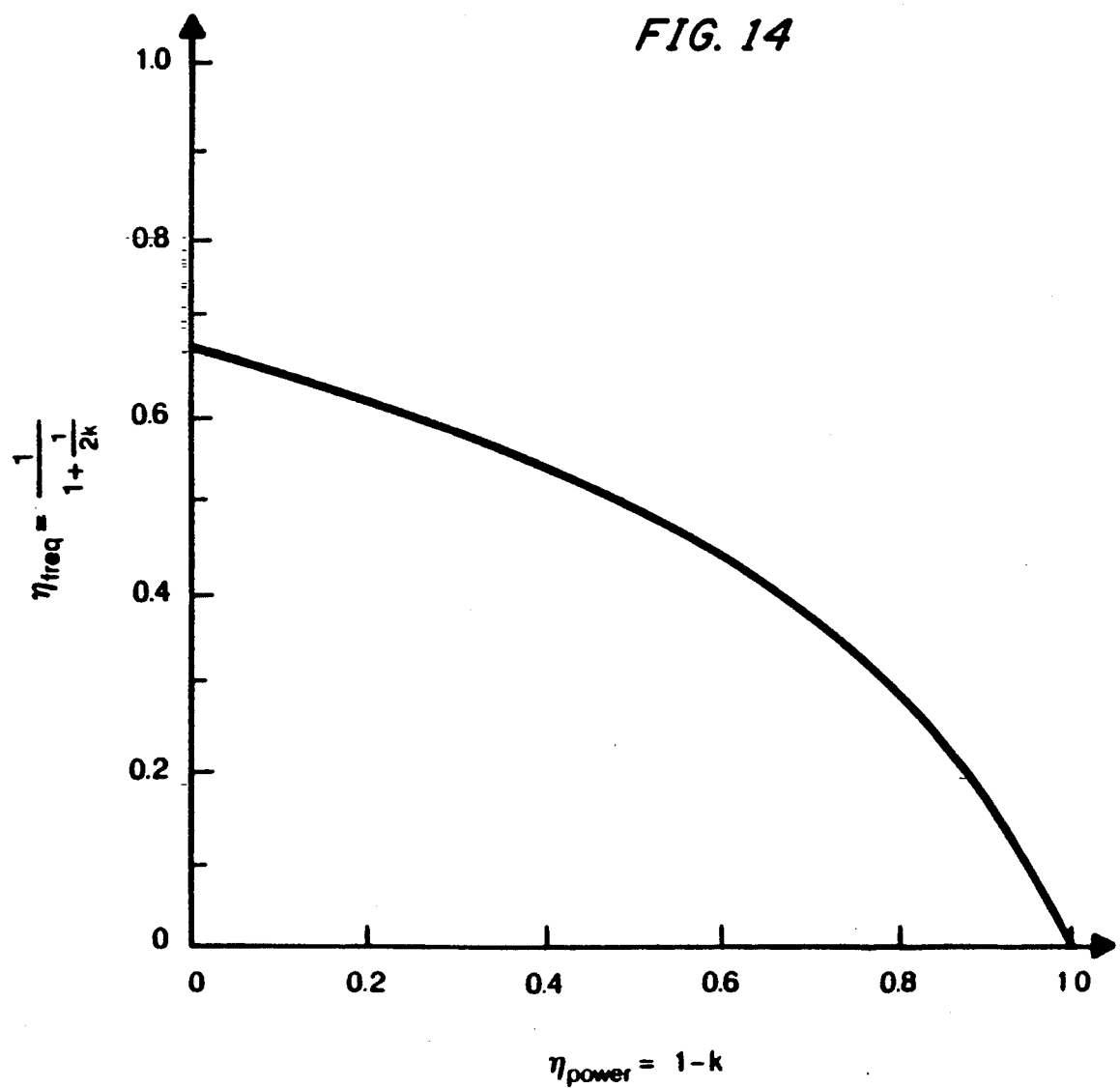
FIG. 14 is a representation of spectral/power efficiency tradeoff. In frequency-shift-based birefringent techniques, there is a tradeoff between power and spectral efficiencies. For high modulation index, the relative power efficiency is high, but this is achieved at the expense of spectral efficiency.

Thus, for small k, there is little overlap and the relative power efficiency is high. However, this is achieved at the expense of spectral efficiency, which from (16) is small for small k. A plot of spectral efficiency versus power efficiency is given in FIG. 14.

C.4 Pulse Separation Approach

Figure 15:
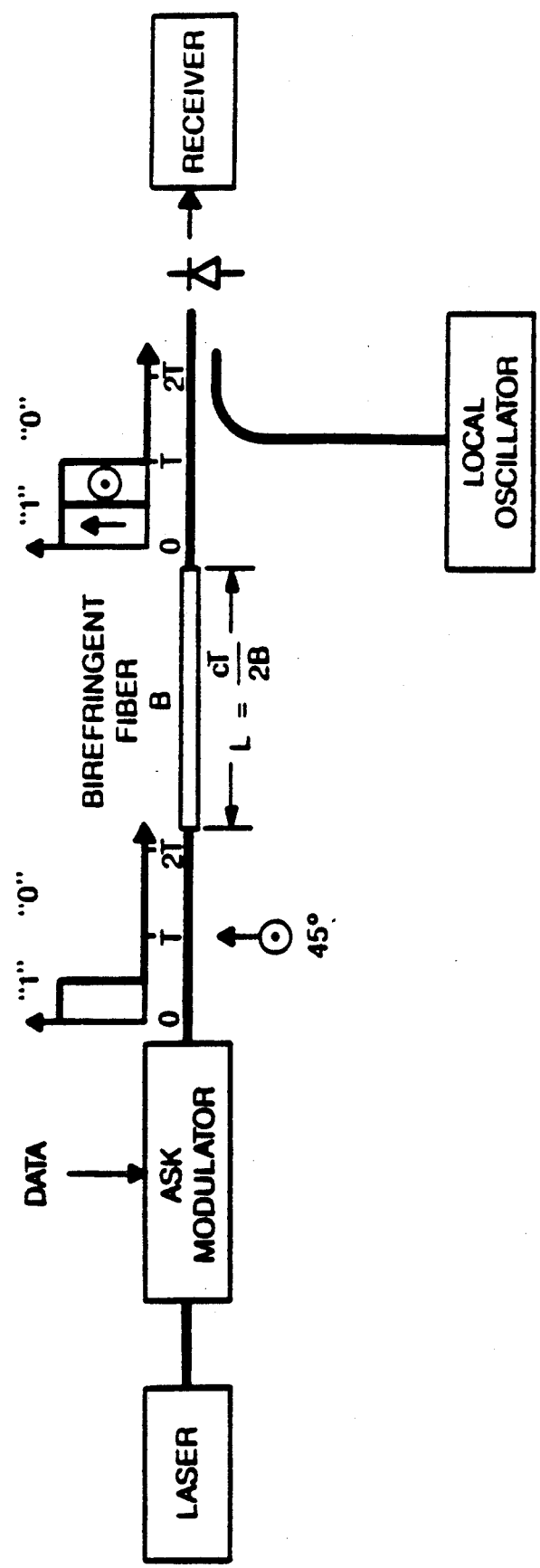
FIG. 15 is a representation of pulse-separation approach-transmitter implementation. Assume that a mark (1) is sent as a pulse of width T/2 and a space (0) is represented by the absence of light. The mark pulse is decomposed in the fiber into two pulses, one with horizontal polarization and one with vertical polarization. These pulses travel at different velocities and, after traveling though the fiber, the two pulses will just separate to fill the entire bit period. Thus, when a mark is sent, for half the bit period we receive light at one polarization and during the other half of the bit period we receive light at the orthogonal polarizations.

In this subsection, we describe an alternative technique which makes use of the pulse spreading caused by the birefringence of the fiber. When a pulse of light is launched at 45° to the principal axes of the fiber, the pulse components along these axes travel with different propagation constants. We can exploit this phenomenon to combine ASK modulation with polarization switching as follows. Assume that a mark (1) is sent as a pulse of width T/2 (with a bit period of T) and a space (0) is represented by the absence of light. The mark pulse is decomposed in the fiber into two pulses, one with horizontal polarization and one with vertical polarization. These pulses travel at different velocities and, after traveling through a length L=cT/2B, the two pulses will just separate to fill the entire bit period, T. Thus, when a mark is sent, for half the bit period we receive light at one polarization and during the other half of the bit period we receive light at the orthogonal polarization. Therefore, irrespective of the local-oscillator polarization, we obtain a mixing efficiency of ½ (a 3 dB loss). For a bit rate of 1 Gb/s, we require 300 m of highly-birefringent fiber with $B=5\times 10^{-4}$. A scheme using these ideas is shown in FIG. 15. The disadvantage of this approach is that it restricts the modulation techniques which can be used to ASK, which requires an external modulator.

Figure 16:
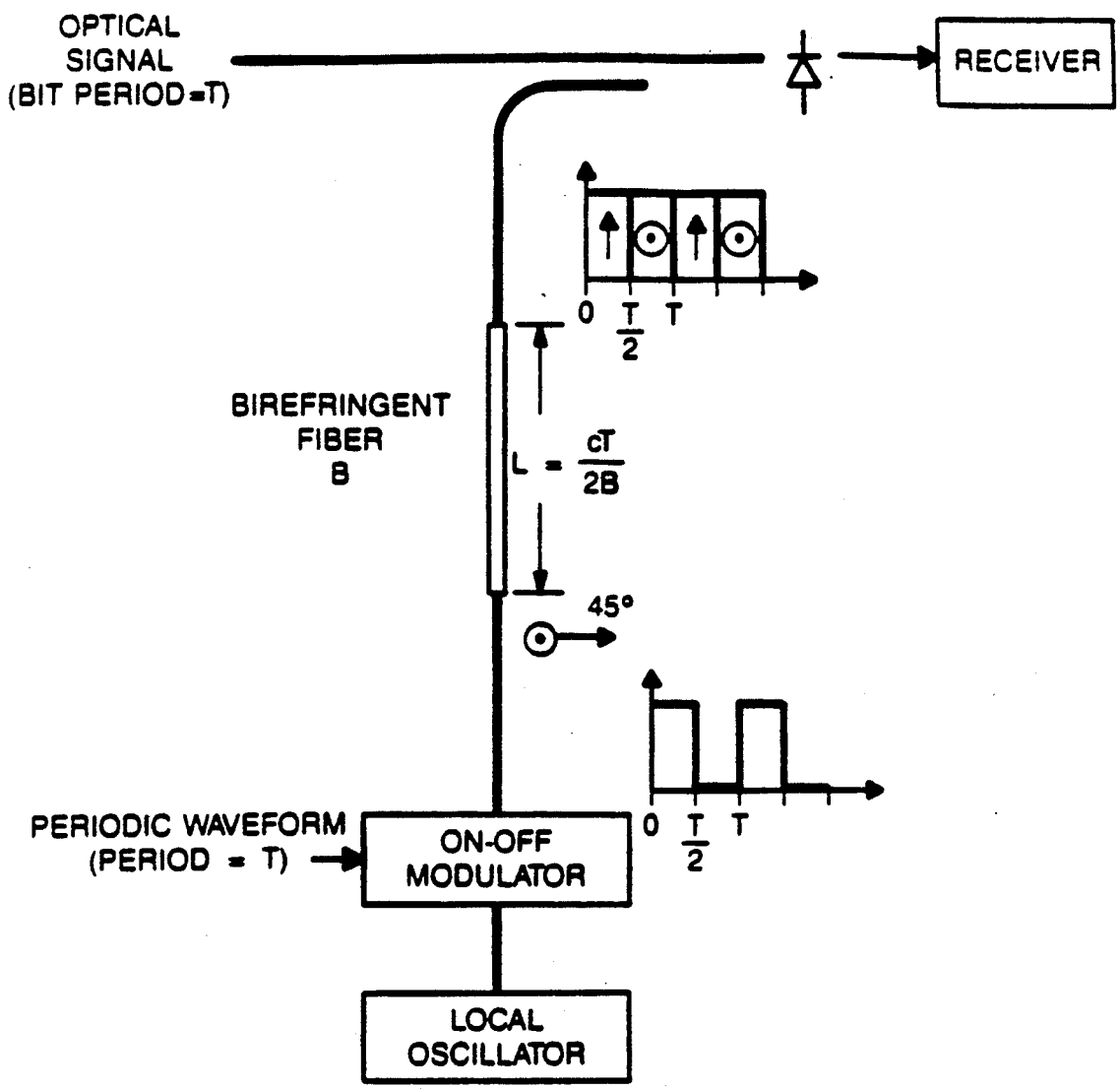
FIG. 16 is a representation of a pulse-separation approach-local oscillator implementation. Assume that the local oscillator is modulated with a periodic waveform of period T. The "on" pulse is decomposed in the fiber into two pulses, one with horizontal polarization and one with vertical polarization. These pulses travel at different velocities and, after traveling through the fiber, the two pulses will just separate to fill the entire period. Thus, for half the bit period the local oscillator has one polarization and during the other half of the bit period it has the orthogonal polarization.

As alternative to the transmitter-based implementation, we can perform the same operation at the local oscillator, as shown in FIG. 16. We then truly have a polarization-switching implementation. This allows us to use any noncoherent modulation technique. Of course, an external modulator is still needed. However, the input signal to the modulator is now a simple periodic waveform, with period T, which may be simpler to implement. In the following section, we will describe an alternative implementation which avoids the use of an external modulator.

C.5 FSK-to-ASK Converter

It has long been recognized that conversion of frequency modulation to amplitude modulation (that is, frequency discrimination) can be accomplished by the use of birefringent crystals. The description of such a discriminator for analog communications is given in (S. E. Harris, "Demodulation of Phase-Modulated Light Using Birefringent Crystals", *IEEE Proc.*, Vol. 52, No. 4, Apr. 1964, pp. 411-412; and M. Ross, *Laser Receivers*, Wiley, 1966, pp. 244-250). Using a similar approach, but replacing the birefringent crystal with a fiber, we can implement an FSK-to-ASK converter. This converter can then replace the external modulator required in implementing the technique described in the previous subsection, so that an all-fiber implementation of polarization switching is possible. The polarization switching is obtained by simply frequency-shift keying the local oscillator laser.

Figure 17:
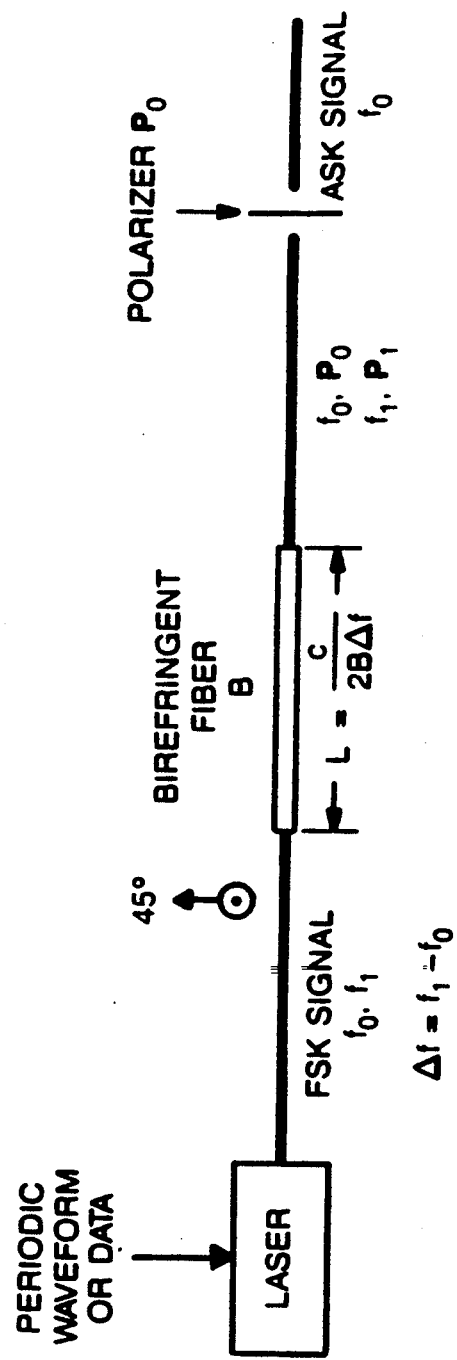
FIG. 17 is a representation of an FSK-to-ASK converter. The laser, which is linearly polarized and launched at 45° to the principal axes of the birefringent fiber, is switched periodically between $f_0$ and $f_1$. The frequency separation $\Delta f = f_1 - f_0$ and the fiber length L are chosen such that they given, at the output, $f_0$ with polarization $P_0$ and $f_1$ with polarization $P_1$, where $P_0$ and $P_1$ are orthogonal. The output light is then passed through an ideal polarizer aligned with either $P_0$ or $P_1$ (say, $P_0$). The polarizer then blocks $P_1$ and therefore blocks $f_1$, so that the output of the polarizer is an on-off signal, giving FSK-to-ASK conversion.

An FSK-to-ASK converter can be constructed as follows. Let the local oscillator laser be linearly polarized and launched at 45° to the principal axes of the birefringent fiber. Also, let the laser be switched periodically between $f_0$ and $f_1$, where the frequency separation $\Delta f = f_1 - f_0$ and the fiber length L are chosen such that they give at the output $f_0$ with polarization $P_0$, and $f_1$ with polarization $P_1$, where $P_0$ and $P_1$ are orthogonal. This was described previously in Section 3.3.3.2. The output light is then passed through an ideal polarizer aligned with either $P_0$ or $P_1$ (say, $P_0$), as shown in FIG. 17. The polarizer then blocks $P_1$ and therefore blocks $f_1$, so that the output of the polarizer is an on-off signal, giving FSK-to-ASK conversion. The polarizer can also be implemented in fiber form (A. J. Noda et al, "Single-Mode Fiber Devices", *Optoelectronics—Devices and Technologies*, Vol. 1, No. 2, Dec. 1986, pp. 175-194).

Figure 18:
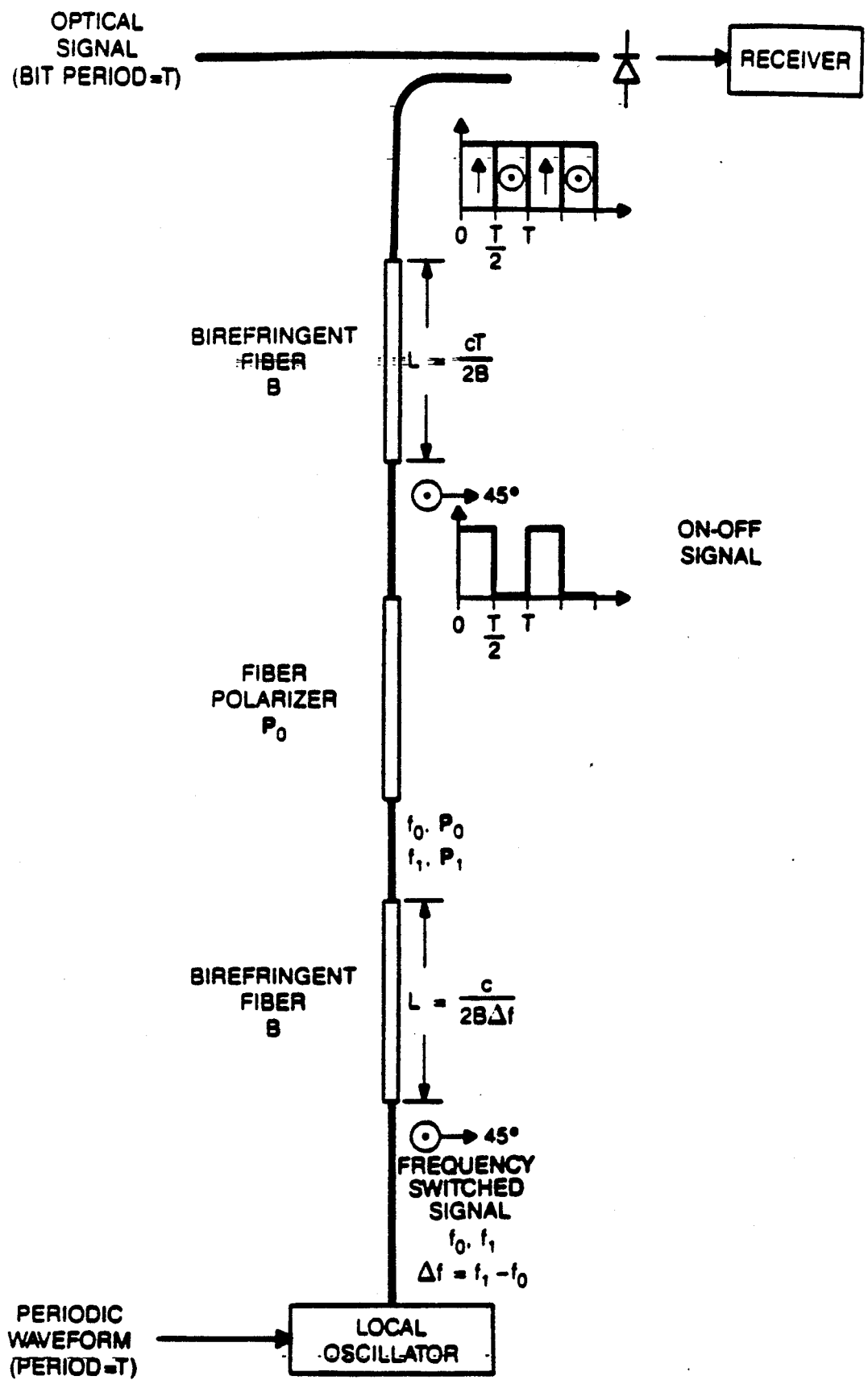
FIG. 18 is a representation of a pulse-separation approach—all-fiber implementation. By combining the pulse separation approach with a fiber FSK-to-ASK converter, an all-fiber polarization-switching implementation is achieved.

The output of the polarizer (which is an on-off signal and is linearly polarized) is launched at 45° to the principal axes of another piece of birefringent fiber of length L=cT/2B. If the input to this section of fiber consists of pulses of width T/2, then the rest of the operation is described as in Section 3.3.3.4. Thus, the polarization switching operation, shown in FIG. 18, is implemented entirely in fiber form, without requiring any external modulators. Potential alignment problems may be eased by using a birefringent fiber whose principal modes are circular (R. Ulrich and A. Simon, "Polarization Optics of Twisted Single-Mode Fibers", *App. Optics*, Vol. 18, No. 13, July 1979, pp. 2241-2251).

Here, we present a demonstration of a particularly simple polarization-insensitive technique. In this approach, we use a combination of frequency and polarization modulation. We arrange for the frequency shift of the transmitted signal to induce the polarization switching by introducing a passive device with high birefringence in the path of the transmitted signal. The polarization switching causes a 3 dB power penalty when compared to an ideal frequency shift keying (FSK) system but provides for polarization-insensitive detection. An advantage of this technique is that it is particulary well-suited to local-area networks because the receiver design is kept simple.

D. Specific Embodiments

In the technique presented here, polarization switching is combined with FSK data modulation, as shown in FIG. 1. At the transmitter, a space (0) is sent as $f_0$ and a mark (1) as $f_1$. The signal is then launched at 45° to the principal axes of a birefringent medium. For a given birefringence, we can choose a frequency separation, $\Delta f = f_1 - f_0$, such that the polarization states at the output, $P_0$ and $P_1$ (corresponding to $f_0$ and $f_1$, respectively), are orthogonal. When FSK is performed at the transmitter, then, at the receiver, we get $f_0$ with polarization $P_0$ and $f_1$ with polarization $P_1$. Notice that frequency modulation of the laser has been converted into both frequency and polarization modulation at the receiver input.

The polarization orthogonality between the two frequencies $f_0$ and $f_1$ remains virtually unaffected in transmission to the receiver (L. J. Cimini, Jr., I. M. I. Habbab, R. K. John and A. A. M. Saleh, "On the Preservation of Polarization Orthogonality Through a Linear Optical System", *Electron. Lett.*, Vol. 23, No. 25, Dec. 3, 1987). At the receiver, the local oscillator mixes with the signal at frequency $f_0$ and polarization $P_0$ when a space (0) is transmitted and with a signal at frequency $f_1$ and polarization $P_1$ when a mark (1) is transmitted. Note that the relative angle between the states of polarization of the local oscillator and the received signal is arbitrary. To see that this is a polarization-insensitive system, assume that a space (0) is sent and that the angle between the local oscillator polarization state, $P_{LO}$, and $P_0$ is $\theta$. In this case, the output of the receiver in FIG. 1 is proportional to $\cos^2\theta$. Assume now that a mark (1) is sent, the output is then proportional to $-\sin^2\theta$. Thus, when data is sent, the separation between the two levels corresponding to a mark and a space ($\cos^2\theta - (-\sin^2\theta) = 1$) remains fixed. However, if the received polarizations drift (that is, if $\theta$ changes), the signal variation is then superimposed on a slowly varying DC bias. This slow variation can be tracked out by AC coupling, as shown in FIG. 1. Note that the level separation obtained here is ½ of that obtained when the polarizations are perfectly matched. Because the signal separation is independent of $\theta$, this detection is polarization-insensitive, suffering a power penalty of 3 dB when compared with heterodyne detection with perfectly-matched polarizations.

Note that, in this approach, each pulse at $f_0$ or $f_1$ is decomposed into two components along the principal axes of the birefringent medium. These components travel with different propagation constants. This causes a given data pulse to interfere with adjacent pulses and, thus, gives rise to intersymbol interference (ISI) at the receiver. It can be shown that, for any birefringent medium, the frequency separation, $\Delta f$, and the time overlap between successive pulses, $\Delta t$, satisfy the relation $\Delta f \Delta t = \frac{1}{2}$ [7]. If the bit rate is $f_b = 1/T$, then, to ensure that ISI is not a problem without taking any additional measures, we can choose $\Delta t << T$, which implies that $\Delta f >> f_b/2$; that is, we must use large modulation index FSK. In any case, this is a required condition for dual-filter detection. A consequence of the relationships for $\Delta t$ and $\Delta f$ is that there is a tradeoff between power and spectral efficiencies. Assuming the spectral efficiency is small (that is, a large modulation index), the loss in power efficiency is negligible.

In the proposed system described above, the birefringent medium could be a long piece of highly birefringent fiber. In this fiber, the polarization state changes periodically with a period (known as the beat length) $L_B = \lambda/B$, where $\lambda$ is the wavelength and B is the birefringence. It can be shown that the length of fiber required to produce switching between orthogonal polarizations is $L = c/2B\Delta f$ [7]. In this work, however, we use an alternative to the high birefringence fiber as described below.

D.1 Experimental Set-Up

Figure 21:
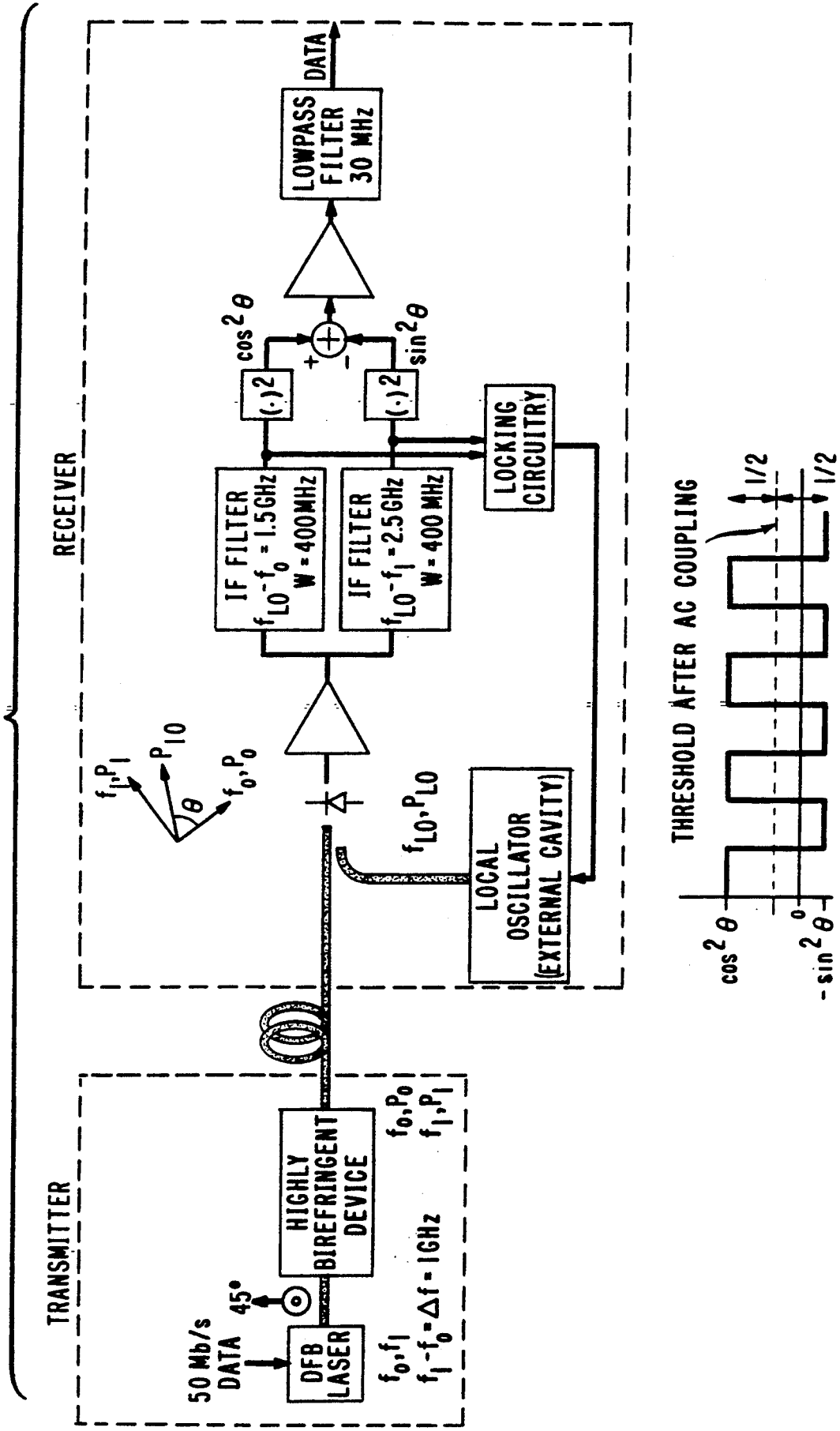
FIG. 21 is a representation of a polarization-insensitive coherent lightwave system usingwide-deviation FSK and data-induced polarization switching. At the transmitter a space (0) is sent as $f_0$ and a mark (1) as $f_1$. These frequencies are chosen so that $f_0$ corresponds to a polarization state at the output of the birefringent medium, $P_0$, and $f_1$ corresponds to $P_1$, where $P_1$ and $P_0$ are orthogonal states. The effect of AC coupling is indicated.
Figure 22:
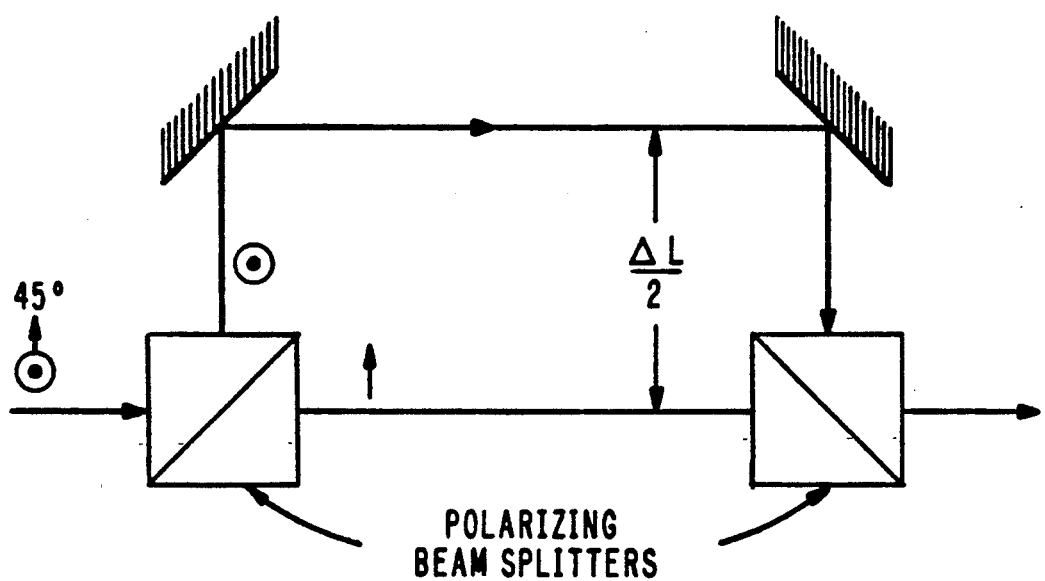
FIG. 22 is a representation of a birefringence simulator. Light launched at 45° to the principal axes of the polarizing beam splitter is separated into horizontal and vertical components. These components travel different distances and are recombined in a polarization-selective coupler with different phases. Thus, this assembly simulates a birefringent medium.

FIG. 21 also shows the set-up used in the experiment. The transmitter consisted of a 1.3 $\mu$m single-cavity double-contact DFB laser with a linewidth of 40 MHz (K. Y. Liou, C. A. Burrus, U. Koren and T. L. Koch, "Two-Electrode Distributed Feedback Injection Laser for Single-Mode Stabilization and Electro-Optical Switching", *App. Phys. Lett.*, Vol. 51, No. 9, Aug. 1987, pp. 634–636). We investigated the frequency response of the laser and found that it was flat between 1 and 500 MHz, with a response of 1.6 GHz/mA. The laser was frequency shift keyed with a 50 Mb/s pseudorandom sequence. A frequency deviation of $\Delta f = 1$ GHz was used, giving a modulation index of 20 (1 GHz/50 MHz). The modulated signal then passed through two optical isolators (not shown) and a birefringent medium. In the experiment, a birefringence simulator, as shown in FIG. 22, was used as the birefringent medium. In this assembly, light is launched at 45° to the principal axes of a polarizing beam splitter and is separated into horizontal and vertical components. These components travel different distances and are recombined in a polarization selective coupler with different phases. It can be shown that the path difference, $\Delta L$, required to provide orthogonal polarizations, is given by $\Delta L = c/2\Delta f = 15$ cm. As described in the previous section, the output of the birefringent device is an optical signal which changes its frequency and polarization in response to the data. This signal was then passed through a transmission medium which consisted of either an optical attenuator or 30 km of single-mode fiber.

At the receiver, the signal was combined with the output of an external-cavity semiconductor local-oscillator laser through a 3-dB coupler. The combined signals were detected in a single PIN photodiode. The resulting photocurrent was amplified and split evenly into two branches. The photodiode was followed, as shown in FIG. 21, by a conventional FSK dual-filter receiver (S. Benedetto, E. Biglieri and V. Castellani, *Digital Transmission Theory*, Prentice-Hall, 1987, pp. 226–239; and I. Garrett and G. Jacobsen, "Theoretical Analysis of Heterodyne Optical Receivers for Transmission Systems Using (Semiconductor) Lasers with Nonnegligible Linewidth", *J. Lightwave Tech.*, Vol. LT-4, No. 3, Mar. 1986, pp. 323–334). This consisted of two bandpass filters centered on 1.5 GHz ($f_{LO} - f_0$) and 2.5 GHz ($f_{LO} - f_1$), respectively, each having a 3-dB bandwidth of 400 MHz. The bandwidth of these filters is larger than the data bandwidth by a factor of 8 in order to reduce the effects of laser phase noise. The signals at the output of each bandpass filter were then passed through square-law detectors, producing baseband components which were then subtracted and passed through a lowpass filter. This filter has a 3-dB bandwidth of 30 MHz which is satisfactory for 50 Mb/s pseudorandom data. The frequency-locking circuitry provided an error signal which was used to lock the local oscillator with a separation of 2 GHz from the transmitter laser.

D.2 Results and Discussion

Figure 23:
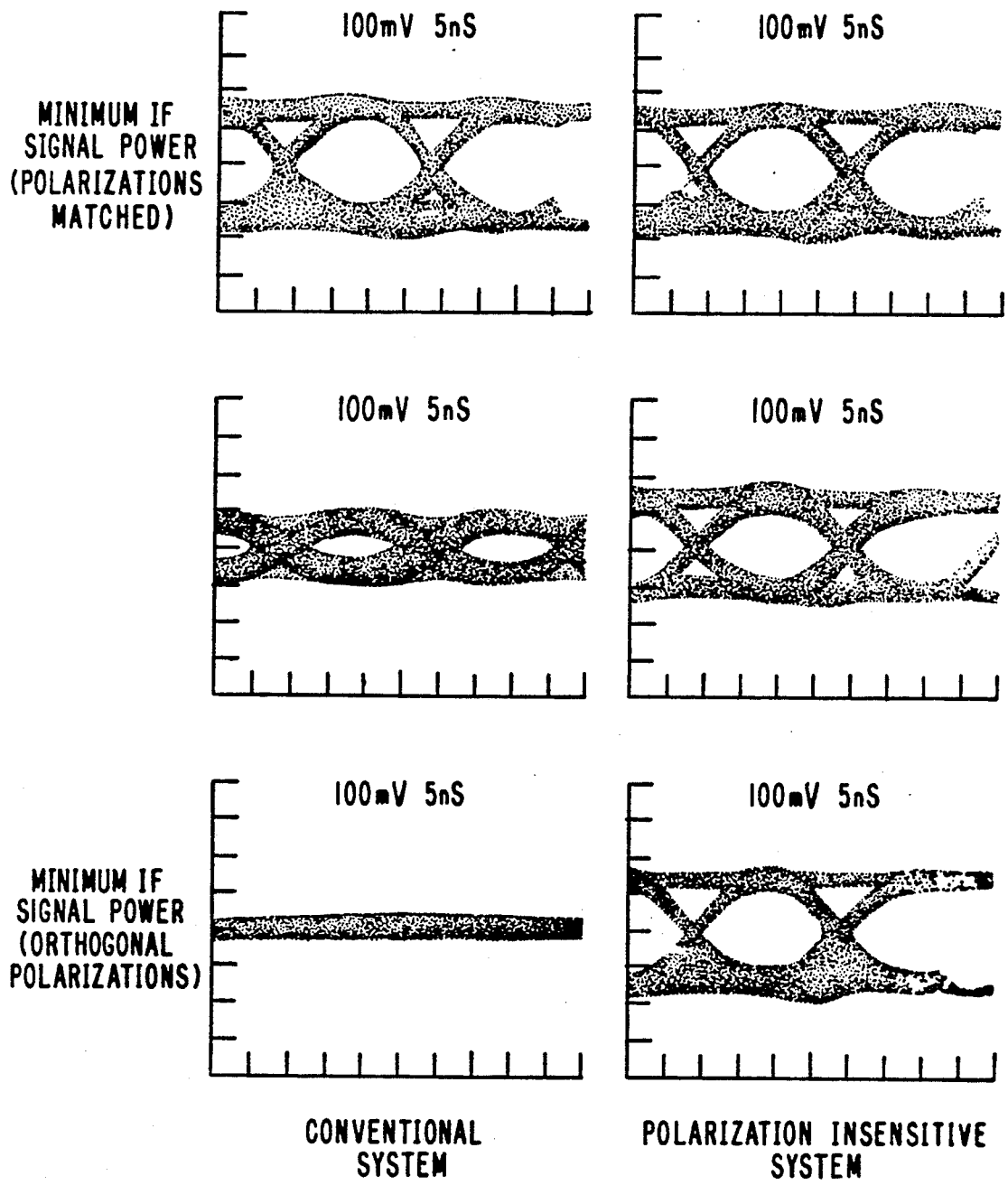
FIG. 23 are representations of eye diagrams. In each column, the polarization states are varied from a perfectly matched to an orthogonal condition. For the conventional system, shown in the left column, we see an eye closure due to the loss of signal caused by a polarization mismatch. In contrast, in the righ column, we show the eye obtained for the polarization-insensitive system. We see that, in this case, the eye remains open regardless of the polarization mismatch.

In this section, we present the experimental results obtained for both a conventional dual-filter FSK system and for the polarization-insensitive FSK system described in Sections 2 and 3. In FIG. 23, we show a series of "eye openings". In each column, the polarization states are varied from a perfectly-matched to an orthogonal condition. For the conventional system, shown in the left column, we see an eye closure due to the loss of signal as the polarization states become mismatched. It is important to stress that, for the worst condition (that is, minimum IF signal power), the eye closure cannot be compensated by increasing the gain. In this case, the polarizations of the signal and local oscillator are orthogonal and no signal appears in the IF. In contrast, in the right column, we show the eye obtained for the polarization-insensitive system. Notice, also, that virtually no ISI is present. This is expected since the time overlap $\Delta t = 0.5$ ns is much less than the bit interval $T = 20$ ns.

Figure 24:
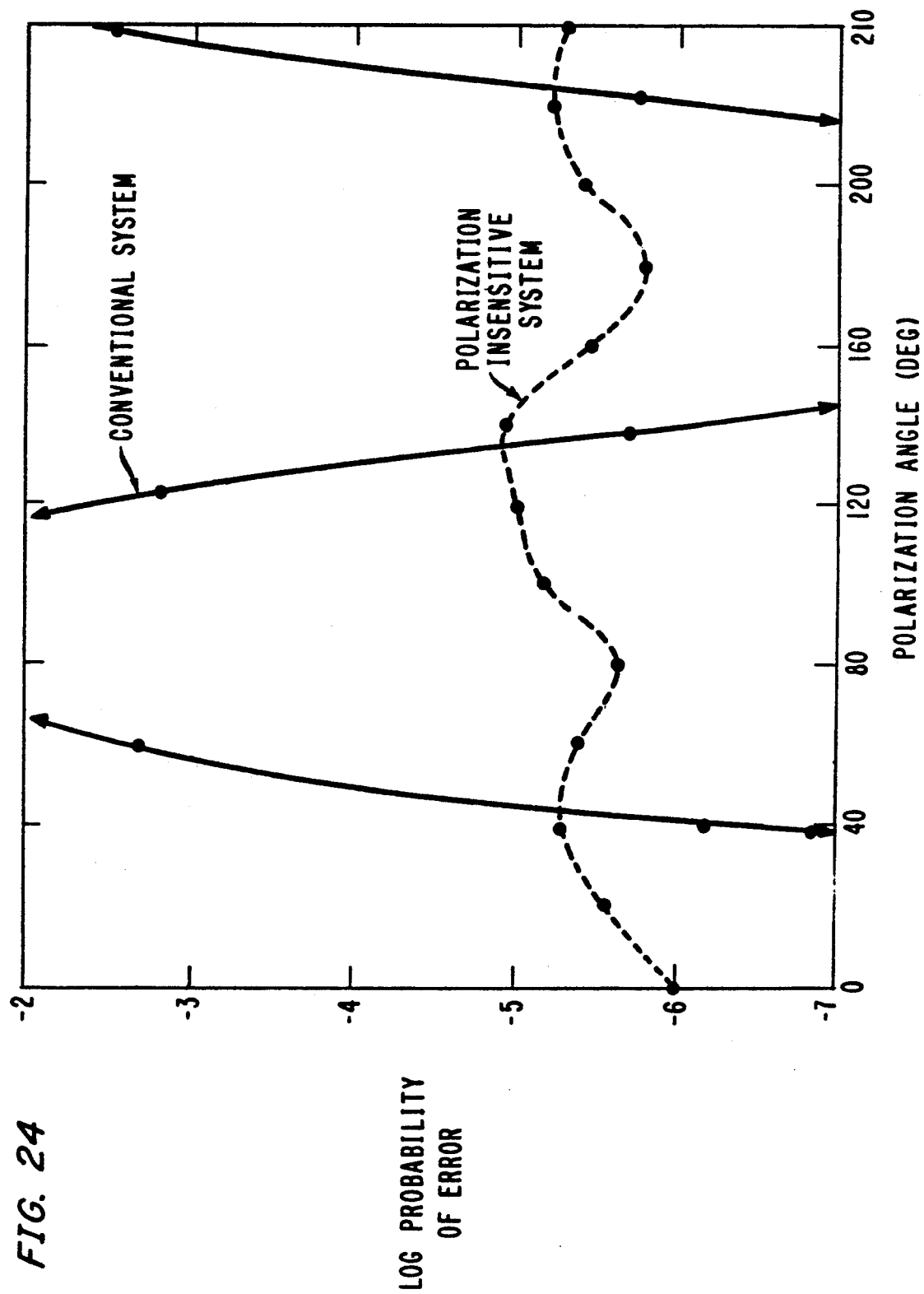
FIG. 24 is a representation of a bit error probability versus polarization angle. The plots indicates the bit error probability versus the angle of the local oscillator for the conventional system and the polarization-insensitive system. We see that, as expected, variations in the angle of polarization cause large variations in the bit error probability for the conventional FSK system. In contrast, the error probability of the polarization-insensitive FSK system changes only slightly as the polarization angle is varied.
Figure 25:
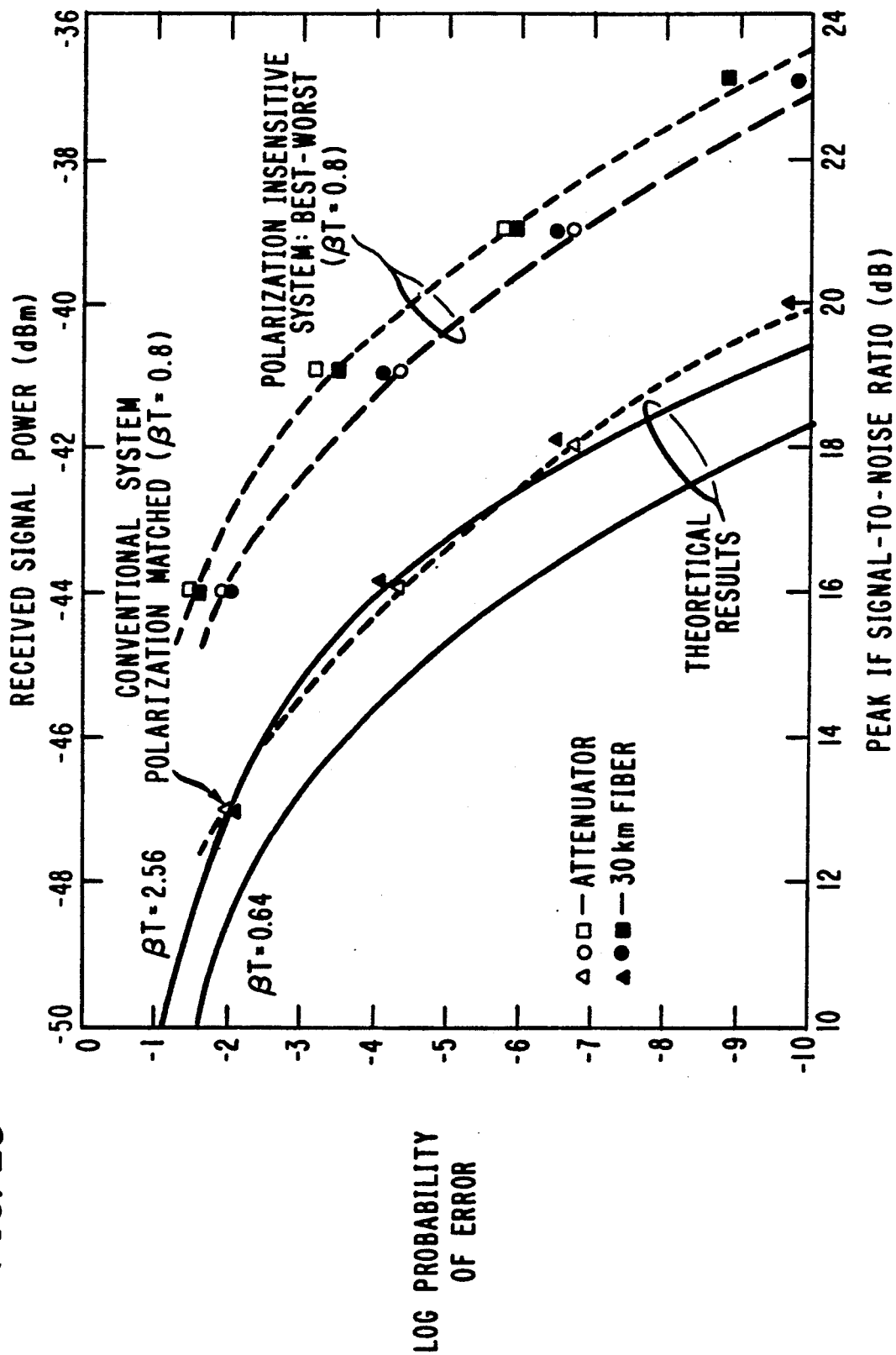
FIG. 25 is a representation of error probability versus peak IF signal-to-noise ratio. The two theoretical plots pertain to linewidth/bit rate ($\beta T$) ratios of 0.64 and 2.56, respectively. In this case, $\beta T = 0.8$, and the theoretical curve lies somewhere between these two. Measurements obtained for the conventional system with perfectly-matched polarizations are shown. Also shown are two curves obtained for the polarization-insenstive system corresponding to best- and worst-case results. Measurements are shown both for transmission through an optical attenuator and through 30 km of single-mode fiber.

In FIG. 24, we have controlled the angle of polarization of the local oscillator by inserting a half-wave plate in its path. The plots shown in FIG. 24 indicate the bit error probability for the conventional system and the polarization-insensitive system as the polarization angle of the local oscillator is varied. In order to reduce the error probability measurement time to a reasonable value, the received signal power was adjusted to give an error probability of about $10^{-6}$ for the latter system. We see that, as expected, variations in the angle of polarization cause large variations in the bit error probability for the conventional FSK system. In contrast, the bit error probability of the polarization-insensitive system changes only slightly as the polarization angle is varied. Theoretically, this curve should be flat with respect to polarization angle. In practice, the measured performance changed by one decade (corresponding to a sensitivity variation of less than 1 dB, as shown in FIG. 25) and this is thought to be due to the nonideal nature of the square-law detectors. This also explains the slight variation in the magnitude of the eye observed in FIG. 23.

Finally, in FIG. 25, we show the bit error probability versus peak IF signal-to-noise ratio (SNR) for transmission through an optical attenuator or through 30 km of single-mode fiber. Essentially, we observed no difference between the performance for the attenuator and for the fiber. The two theoretical plots are obtained from and pertain to linewidth/bit rate ($\beta T$) ratios of 0.64 and 2.56, respectively. In our case, $\beta T = 0.8$, and the theoretical curve lies somewhere between these two. We show measurements obtained for the conventional system with perfectly matched polarizations. These results agree within 1 dB of the theory. Of course, for the conventional FSK system, with orthogonal polarizations, we would have an error probability of 0.5, independent of SNR. For the polarization-insensitive FSK system, we show two curves corresponding to the best- and worst-case results. They show that this technique suffers a power penalty of 3 to 4 dB when compared to measurements for the conventional system with perfectly matched polarizations. This compares well with the expected penalty of 3 dB. FIG. 5 also shows a translation between measured peak IF signal-to-noise ratio and measured received optical power into the photodetector. These measurements also confirm that polarization orthogonality is essentially preserved in transmission through 30 km of optical fiber (L. J. Cimini, Jr., I. M. I. Habbab, R. K. John and A. A. M. Saleh, "On the Preservation of Polarization Orthogonality Through a Linear Optical System", *Electron. Lett.*, Vol. 23, No. 25, Dec. 3, 1987).

APPENDIX A

The electric field vector of a uniform plane wave of arbitrary polarization traveling in the z-direction is in general, given by $$E(z,t) = E_x \cos\left(\omega t - \frac{2\pi}{\lambda} z + \delta_x\right) x + E_y \cos\left(\omega t - \frac{2\pi}{\lambda} z + \delta_y\right) y. \quad (A-1)$$

This can be written as $$E(z,t) = Re\left[e^{j(\omega t - \frac{2\pi}{\lambda} z)} E(0)\right], \quad (A-2)$$

where $$E(0) = \begin{bmatrix} E_x e^{j\delta_x} \\ E_y e^{j\delta_y} \end{bmatrix} \quad (A-3)$$

is known as the Jones vector [46]. This vector contains complete information about the amplitudes and phases of the field components and, hence, about the state of polarization of the wave.

In the most general case, both the received signal and local oscillator are elliptically polarized with Jones vectors $E_S$ and $E_{LO}$ given by $$E_S = \begin{pmatrix} E_{SX} e^{j\delta_{SX}} \\ E_{SY} e^{j\delta_{SY}} \end{pmatrix} \quad (A-4)$$

and $$E_{LO} = \begin{pmatrix} E_{LX} e^{j\delta_{LX}} \\ E_{LY} e^{j\delta_{LY}} \end{pmatrix}. \quad (A-5)$$

Figure 19:
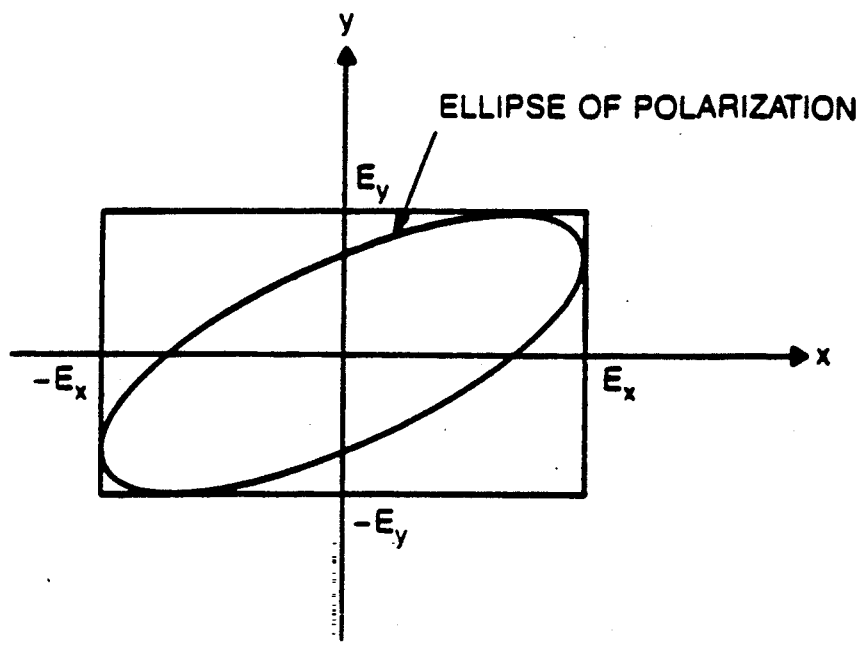
FIG. 19 is a representation of a polarization ellipse.

The mixing efficiency, m, is given by $$m = \frac{|E_{LO} \cdot E_S|^2}{||E_{LO}||^2 \, ||E_S||^2} \quad (A-6)$$

$$= \frac{|E_{LX} E_{SX} e^{j(\delta_{SX} - \delta_{LX})} + E_{LY} E_{SY} e^{j(\delta_{SY} - \delta_{LY})}|^2}{(E_{LX}^2 + E_{LY}^2)(E_{SX}^2 + E_{SY}^2)}$$

$$= \frac{E_{LX}^2 E_{SX}^2 + E_{LY}^2 E_{SY}^2 + 2 E_{LX} E_{SX} E_{LY} E_{SY} \cos\Delta}{E_{LX}^2 E_{SX}^2 + E_{LX}^2 E_{SY}^2 + E_{LY}^2 E_{SX}^2 + E_{LY}^2 E_{SY}^2}$$

where $||\cdot||$ denotes the norm, that is, $||x|| = \sqrt{x^\dagger x}$, $\dagger$ means the transpose complex conjugate of the vector and $\Delta = (\delta_{SX} - \delta_{LX}) - (\delta_{SY} - \delta_{LY})$. Let $\tan \rho_{LO} = E_{LY}/E_{LX}$ and $\tan \rho_S = E_{SY}/E_{SX}$ where, in each case a rectangle of coordinates $(\pm E_{LX}, \pm E_{LY})$ $(\pm E_{SX}, \pm E_{SY})$ contains the ellipse of polarization, as shown in FIG. 19. Using these definitions, the mixing efficiency in (A-6) becomes $$m = \frac{1 + \tan^2\rho_{LO}\tan^2\rho_S + 2\tan\rho_{LO}\tan\rho_S\cos\Delta}{1 + \tan^2\rho_{LO}\tan^2\rho_S + \tan^2\rho_{LO} + \tan^2\rho_S} \quad (A-7)$$

An angle $\theta = f(\rho_{LO}, \rho_S, \delta_{SX}, \delta_{LX}, \delta_{SY}, \delta_{LY})$ can always be found such that the above mixing efficiency, m, is equal to $\cos^2\theta$.

In the simpler case where the local oscillator is linear, (A-7) is still valid with the angle of polarization $\rho_{LO} = \theta_{LO} = \tan^{-1} E_{LY}/E_{LX}$ and $\Delta = \delta_{SX} - \delta_{SY}$. In the simplest case where both the local oscillator and received signal are linearly polarized with the signal polarization angle $\rho_S = \theta_S = \tan^{-1} E_{SY}/E_{SX}$, (A-7) reduces to $$m = \frac{1 + \tan^2\theta_{LO}\tan^2\theta_S + 2\tan\theta_{LO}\tan\theta_S}{1 + \tan^2\theta_{LO}\tan^2\theta_S + \tan^2\theta_{LO} + \tan^2\theta_S} = \cos^2(\theta_{LO} - \theta_S) \quad (A-8)$$

which is the mixing efficiency in (3) with $\theta = \theta_{LO} - \theta_S$.

APPENDIX B

Figure 20:
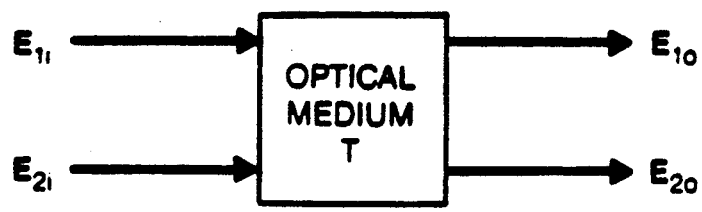
FIG. 20 is a representation of transmission through a linear optical system. A linear optical system can be modeled by a 2×2 transmission matrix, T, of complex numbers. $E_{1i}$ and $E_{2i}$ are complex unit vectors describing the input states of polarizations and $E_{1o}$ and $E_{2o}$ are the corresponding complex vectors describing the states of polarization at the output.

In this appendix, we derive the bound on the loss of orthogonality after transmission through any linear optical system. These systems can be modeled by a 2×2 transmission matrix, T, of complex numbers as shown in FIG. 20, where $E_{1i}$ and $E_{2i}$ are complex unit vectors describing the input states of polarizations and $E_{1o}$ and $E_{2o}$ are the corresponding complex vectors describing the states of polarization at the output. Assume that the input waves have orthogonal states of polarization, that is, $$|E_{2i}^\dagger E_{1i}| = 0, \quad (B-1)$$

where † means the transpose complex conjugate of the vector. The cosine of the angle between $E_{1i}$ and $E_{2i}$ is therefore zero. The degradation in orthogonality at the output is related to $$|\cos \delta|^2 = \frac{|E_{2o}\ E_{1o}|^2}{||E_{1o}||^2\ ||E_{2o}||^2} = \frac{|E_{2i}\ T\ TE_{1i}|^2}{|E_{1i}\ T\ TE_{1i}||E_{2i}\ T\ TE_{2i}|} \quad (B-2)$$

where $||\cdot||$ denotes the norm, that is, $||x|| = \sqrt{x\ x}$.

Using the similarity transformation and the fact that $T^\dagger T$ is Hermitian (real non-negative eigenvalues), then, $T^\dagger T = Q^\dagger \Lambda Q$, where $\Lambda$ is a diagonal matrix $$\Lambda = \begin{pmatrix} T_{max} & 0 \\ 0 & T_{min} \end{pmatrix}. \quad (B-3)$$

The eigenvalues $T_{max}$ and $T_{min}$ are the maximum and minimum power transfer coefficients of the medium as the state of polarization is varied. Therefore, (B-2) becomes $$|\cos \delta|^2 = \frac{|E_{2i}\ Q\ \Lambda QE_{1i}|^2}{|E_{1i}\ Q\ \Lambda QE_{1i}||E_{2i}\ Q\ \Lambda QE_{2i}|}. \quad (B-4)$$

Defining two vectors $X = QE_{1i} = (x_1\ x_2)^T$ and $Y = -QE_{2i} = (y_1\ Y_2)^T$ which are orthogonal and have unit norm, (B-4) becomes $$|\cos \delta|^2 = \frac{|Y\ \Lambda X|^2}{|X\ \Lambda X||Y\ \Lambda Y|} = \quad (B-5)$$

$$\gamma^2 \frac{\left|Y \begin{pmatrix} 1 & 0 \\ 0 & -1 \end{pmatrix} X\right|^2}{\left|1 + \gamma X \begin{pmatrix} 1 & 0 \\ 0 & -1 \end{pmatrix} X\right| \left|1 + \gamma Y \begin{pmatrix} 1 & 0 \\ 0 & -1 \end{pmatrix} Y\right|}$$

where $$\gamma = \frac{T_{max} - T_{min}}{T_{max} + T_{min}}. \quad (B-6)$$

Since X and Y are orthogonal and of unit norm, (B-5) can be written in terms of a single independent component as $$|\cos \delta|^2 = \gamma^2 \left[ \frac{4|x_1|^2(1 - |x_1|^2)}{1 - \gamma^2(2|x_1|^2 - 1)^2} \right]. \quad (B-7)$$

$|\cos \delta|^2$ can be bounded by maximizing the quantity in brackets in (B-7). It is easy to show that the maximum value of this quantity is 1 and it is obtained for $|x_1|^2 = \frac{1}{2}$. Therefore, $$|\cos \delta| \leq \frac{T_{max} - T_{min}}{T_{max} + T_{min}}. \quad (B-8)$$

Equality is achieved in (B-8) when $$X = \frac{1}{\sqrt{2}} \begin{pmatrix} 1 \\ e^{j\phi} \end{pmatrix} \quad (B-9)$$

-continued and $$Y = \frac{1}{\sqrt{2}} \begin{pmatrix} e^{-j\phi} \\ -1 \end{pmatrix}. \quad (B-10)$$

If $\phi = 0$ (linear polarizations) X and Y are at 45° to the eigenvectors of $T^\dagger T$. In general, (B-8) is satisfied with equality when each of the launched states has equal powers along the principal axes.

APPENDIX C

Assume that a linearly polarized optical wave at wavelength $\lambda_0$ is launched into a birefringent fiber of length L at 45° to the principal axes of the fiber. The Jones vector $E_{in}$ of the input polarization is then given by $$E_{in} = E \begin{pmatrix} 1 \\ 1 \end{pmatrix} \quad (C-1)$$

The Jones vector $E_0$ of the output polarization is modified by the Jones matrix of a linear birefringent medium, and is given by (assuming no power transfer between the modes)*

$$E_0 = E \begin{pmatrix} e^{-j\frac{2\pi n_x L}{\lambda_0}} & 0 \\ 0 & e^{-j\frac{2\pi n_y L}{\lambda_0}} \end{pmatrix} \begin{pmatrix} 1 \\ 1 \end{pmatrix} = E \begin{pmatrix} e^{-j\frac{2\pi n_x L}{\lambda_0}} \\ e^{-j\frac{2\pi n_y L}{\lambda_0}} \end{pmatrix}. \quad (C-2)$$

For another input wavelength $\lambda_1$, the Jones vector of the corresponding output polarization is $$E_1 = E \begin{pmatrix} e^{-j\frac{2\pi n_x L}{\lambda_1}} \\ e^{-j\frac{2\pi n_y L}{\lambda_1}} \end{pmatrix}. \quad (C-3)$$

For orthogonality, we require $E_1^+ E_0 = 0$ where † means the transpose complex conjugate of the vector. This condition translates into $$e^{j(2\pi n_x L(\frac{1}{\lambda_1} - \frac{1}{\lambda_0}))} + e^{j(2\pi n_y L(\frac{1}{\lambda_1} - \frac{1}{\lambda_0}))} = 0. \quad (C-4)$$

The above equation is satisfied if the difference between the exponents is an odd multiple of $\pi$. For the smallest frequency deviation satisfying this condition, we have \* Random mode coupling which causes power transfer between modes is ignored in what follows. This is not an unreasonable assumption for highly-birefringent fiber. In addition, we can handle any random mode coupling in a real implementation simply by adjusting the frequency deviation.

$$\frac{2\pi LB}{\lambda_1} - \frac{2\pi LB}{\lambda_0} = \Phi(L_1 \lambda_1) - \Phi(L_1 \lambda_0) = \pi \quad (C-5)$$

where $B = n_x - n_y$.

We claim:
1. A method of polarization insensitive coherent detection of an optical signal comprising,
   mixing two optical signals, at least one of which comprises a bit stream representative of intelligence which is transmitted at a given bit rate, the polarization of at least one of the signals varying independently of the polarization of the other signal at a rate slower than the given bit rate, the invention characterized in that the polarization of the other of the two signals is caused to vary at a rate greater than or equal to the bit rate.

2. The method of claim 1 wherein polarization of said at least one signal is caused to vary by directing the signal into birefringent material.

3. The method of claim 1 wherein the bit stream comprises an FSK or ASK signal, and is transmitted through a birefringent material.

4. An optical communication system comprising, means for generating a first, optical signal comprising a bit stream representative of intelligence, means for generating a second, optical, local oscillator, signal, one of the said first or second signals varying in polarization at a rate less than or equal to the bit rate, means for mixing the said first and second signals, the invention characterized in that the said optical communication system further comprises, means for varying the polarization of at least one of the first or second signals at a rate greater than or equal to the bit rate.

5. The system of claim 4 wherein said means for varying the polarization of at least one of the signals comprises a birefringent material.

6. The system of claim 5 wherein the said optical signal, comprising a bit stream representative of intelligence, is an FSK or an ASK signal.

* * * * *